US008422961B2

(12) United States Patent
Kafle

(10) Patent No.: US 8,422,961 B2
(45) Date of Patent: Apr. 16, 2013

(54) BEAMFORMING TRAINING FOR FUNCTIONALLY-LIMITED APPARATUSES

(75) Inventor: Padam Lal Kafle, Coppell, TX (US)

(73) Assignee: Nokia Corporation, Espoo (FI)

(*) Notice: Subject to any disclaimer, the term of this patent is extended or adjusted under 35 U.S.C. 154(b) by 633 days.

(21) Appl. No.: 12/390,880

(22) Filed: Feb. 23, 2009

(65) Prior Publication Data

US 2010/0214169 A1 Aug. 26, 2010

(51) Int. Cl.
H04B 17/00 (2006.01)

(52) U.S. Cl.
USPC ........................................ 455/67.14; 342/368

(58) Field of Classification Search .................. 455/562; 375/267, 259; 342/368; 370/252, 336
See application file for complete search history.

(56) References Cited

U.S. PATENT DOCUMENTS

| 2003/0169769 | A1* | 9/2003 | Ho et al. ....................... 370/473 |
| 2006/0111129 | A1* | 5/2006 | Ihm et al. ...................... 455/466 |
| 2007/0249404 | A1* | 10/2007 | Gao et al. ..................... 455/562.1 |
| 2008/0247370 | A1* | 10/2008 | Gu et al. ....................... 370/338 |
| 2009/0046010 | A1 | 2/2009 | Niu et al. |
| 2009/0233549 | A1* | 9/2009 | Maltsev et al. ............... 455/41.2 |
| 2010/0061271 | A1* | 3/2010 | Seyedi-Esfahani et al. .. 370/254 |
| 2010/0103045 | A1 | 4/2010 | Liu et al. |
| 2010/0150254 | A1* | 6/2010 | Hansen et al. ................ 375/259 |
| 2010/0157955 | A1* | 6/2010 | Liu et al. ...................... 370/336 |

FOREIGN PATENT DOCUMENTS

| EP | 2104245 | 9/2009 |
| WO | WO2007040515 | 4/2007 |
| WO | 2008/002972 A2 | 1/2008 |
| WO | 2009/102124 A2 | 8/2009 |

OTHER PUBLICATIONS

International Search Report mailed Jun. 21, 2010 for International Application No. PCT/IB2010/050065.

* cited by examiner

*Primary Examiner* — Joseph Chang
*Assistant Examiner* — Jeffrey Shin
(74) *Attorney, Agent, or Firm* — Locke Lord LLP

(57) ABSTRACT

A system for configuring antenna systems for selecting directional communication signals corresponding to other apparatuses. A directional communication signal may be selected as the result of a beamforming training operation coordinated between an initiating apparatus and a responder apparatus. Particular modes and/or features may be requested by initiating apparatuses that, for example, may be functionally-limited. The responder may take these requested modes and/or features into account when formulating a beamforming training set for transmission to the initiator.

31 Claims, 16 Drawing Sheets

FIG. 12

BT SETUP REQUEST FRAME STRUCTURE

| Octets: 2 | 2 | 6 | 6 | 5-11 | 4 |
|---|---|---|---|---|---|
| Frame Control | Duration | RA | TA | BFT Request IE Field | FCS |

1200

BFT REQUEST IE FIELD STRUCTURE

| Element ID | Length | BT Mode Control Field | Optional Sector Training Map (list of sector ids requested for REV training) |
|---|---|---|---|
| Octet: 1 | 1 | 3 | 6 |

1202

BT MODE CONTROL FIELD IN THE BFT REQUEST IE FIELD

| Training Order | FWD/REV Training | FWD N_TxDIR | FWD RxDIR_Limit | REV TxDIR_Limit | REV N_RxDIR |
|---|---|---|---|---|---|
| Bits: B0 | B1 | B2-B7 | B8-B12 | B13-B18 | B19-B23 |
| Details: 0 – FWD First 1 – REV First | 0 – both 1 – only FWD or REV | Requested Value | Limit supported for Tx | Limit supported for Rx | Requested Value |

1204

BEAMFORMING TRAINING FOR FUNCTIONALLY-LIMITED APPARATUSES

BACKGROUND

1. Field of Invention

Various example embodiments of the present invention relate to the configuration of wireless communication, and in particular, to the configuration of directional communication using beamforming training processes that determine and select transmission and reception directions.

2. Background

Technological advancement in very high-speed wireless networks for short-range wireless communication has been driven by emerging broadband applications such as wireless high-definition multimedia interfaces (wHDMI), wireless gaming interfaces, wireless high-speed backhaul and content distribution services, etc. Designers have targeted the 60 GHz millimeter band (mmWave) for implementing high speed and/or high capacity wireless networks in view of the abundance of worldwide availability of unlicensed spectrum in this band. In at least one scenario, standards for very high throughput (VHT) wireless local area networks (WLAN) that are currently under development are aiming at very high throughput targets over 1 Gbps data rates.

However, implementing wireless communication architectures in the mmWave band presents many challenges. For example, potential new radio designs will be substantially impacted by link budget constraints. In particular, when compared to lower frequency band systems, the coverage range in the mmWave band is severely limited by very high free space propagation loss, higher penetration, reflection and scattering losses and atmospheric oxygen absorption that will impact upon communication carrier waves operating within this spectrum.

The increased sensitivity to environmental influences that has become evident in the mmWave band may impact the overall operational efficiency of communication. Wireless signal quality may suffer due to, for example, unstable connections and the retransmission of lost packets may noticeably impact communication performance, as well as other systems relying upon these resources. As a result, any capacity benefits that could be realized by operating in the 60 GHz band may therefore be somewhat nullified by poor communication performance.

SUMMARY

Example implementations of the present invention, in accordance with various embodiments, may be directed to at least a process, computer program, apparatus and system for facilitating the selection of directional communication signals corresponding to apparatuses with which wireless communication is desired. In accordance with at least one example embodiment of the present invention, a training process may comprise transmit sector sweeps (TxSS) in forward and/or reverse directions followed by a beam-refinement process. This TxSS step may involve the transmission of beamforming training frames (BFT) from the transmitter that are steered over a sequence of transmit sectors with known time spacing between them.

During transmission of the TxSS frames from the transmitter the receiver may be in a quasi-omni receive mode, during which the beamforming gain from transmit side is utilized with no gain in receive side. However, there may be scenarios where apparatuses support only fixed beam gains or have limited directional transmit and/or receive capabilities. Furthermore, beamforming training should be configurable or customizable based on the preferences of requesting stations, which may vary depending upon the requirements of active applications, power consumption and channel reciprocity conditions or antenna configuration limitations.

The foregoing summary includes example embodiments of the present invention that are not intended to be limiting. The above embodiments are used merely to explain selected aspects or steps that may be utilized in implementations of the present invention. However, it is readily apparent that one or more aspects, or steps, pertaining to an example embodiment may be combined with one or more aspects, or steps, of other embodiments to create new embodiments still within the scope of the present invention. Therefore, persons of ordinary skill in the art would appreciate that various embodiments of the present invention may incorporate aspects from other embodiments, or may be implemented in combination with other embodiments.

DESCRIPTION OF DRAWINGS

Various example embodiments of the present invention may be understood from the following detailed description and example implementations taken in conjunction with the appended drawings, wherein:

FIG. 12 discloses examples of request frame structures and field parameters usable in accordance with at least one embodiment of the present invention.

DESCRIPTION OF EXAMPLE EMBODIMENTS

While the present application has been described below embodied in terms of one or more implementation examples, various changes may be made therein without departing from the spirit and scope of the invention, as described in the appended claims.

To overcome potentially huge path losses that may be experienced when implementing, for example, a 60 GHz radio architecture, beamforming techniques for adjusting multi-element antenna systems at both the transmission and reception sides may become very important. In many channel environments, the lack of significant scattering or richness in multipath operation may reduce the applicability of traditional multiple input-multiple output (MIMO) spatial multiplexing schemes in an effort to increase the spectral efficiency. As a result, simple beamforming techniques with the objective of transmitting and receiving towards the best beam-direction in order to maximize the signal-to-noise ratio (SNR) for single spatial data stream are required. Given the much smaller wavelength (for example, 5 mm for 60 GHz) in this band, a substantial number of antenna elements may be constructed in a relatively small area that may further be integrated with other RF components in the RF front-end. To extend the range of coverage, these antenna systems may be equipped with beam steering capability to focus upon the best direction of transmission and reception. Antenna systems may further consist of multiple sectored antennas with sector switching capability over a desired sector direction.

Figure 1A:
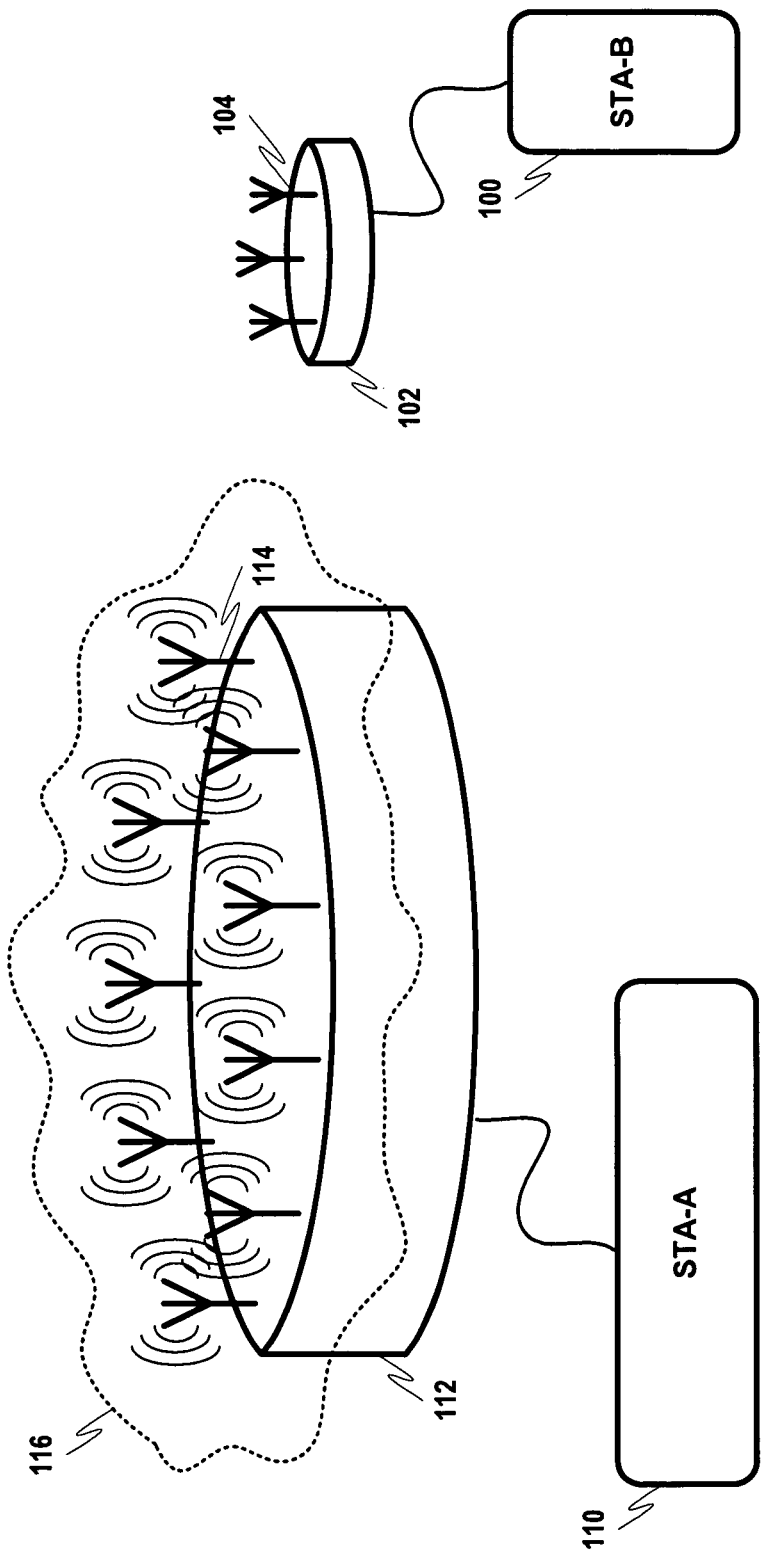
FIG. 1A discloses examples of apparatuses interacting via wireless communication in accordance with at least one embodiment of the present invention.

FIG. 1A discloses an example comprising two apparatuses that will be utilized herein to explain various example implementations of the present invention. While two devices including a first station (STA-A) and second station (STA-B) 100 are shown in FIG. 1A, the different embodiments of the present invention are not specifically limited to this configuration, and may be applied in scenarios wherein more devices are interacting. For example, one of the apparatuses may take the role of a control point in a private basic service set (a PCP in a PBSS). Furthermore, situations may also exist where one of the apparatuses takes the role of the PCP only temporarily, for example, in an ad-hoc networking environment where the roles of the participating apparatuses are constantly changing. In addition, STA-A 110 and STA-B 100 are shown coupled to external antenna systems 112 and 102, respectively. While these antenna systems have been shown as entities separate from each apparatus, this representation has been used merely to facilitate the disclosure of the various embodiments of the present invention. As set forth above, antenna systems for use in, for example, the 60 GHz band may also be implemented in a more compact configuration (for example, as part of a integrated circuit or chipset) that may incorporated within each apparatus.

Each antenna system may include a plurality of antennas (for example, shown at 114 and 104). The number of antennas in an antenna system may depend on the characteristics of an apparatus. For example, restrictions in apparatus size, power, processing, etc. may dictate the number of antennas that may be supported in an apparatus. Some or all of the antennas 114 and 104 in antenna systems 112 and 102 may be active at any given time, which may result in a communication signal, represented for example in FIG. 1A at 116. In the example configuration disclosed in FIG. 1A, signal 116 is operating in a multidirectional mode. There may also be instances where the antenna system may comprise, for example, a switched set of directional fixed-beam antennas.

Figure 1B:
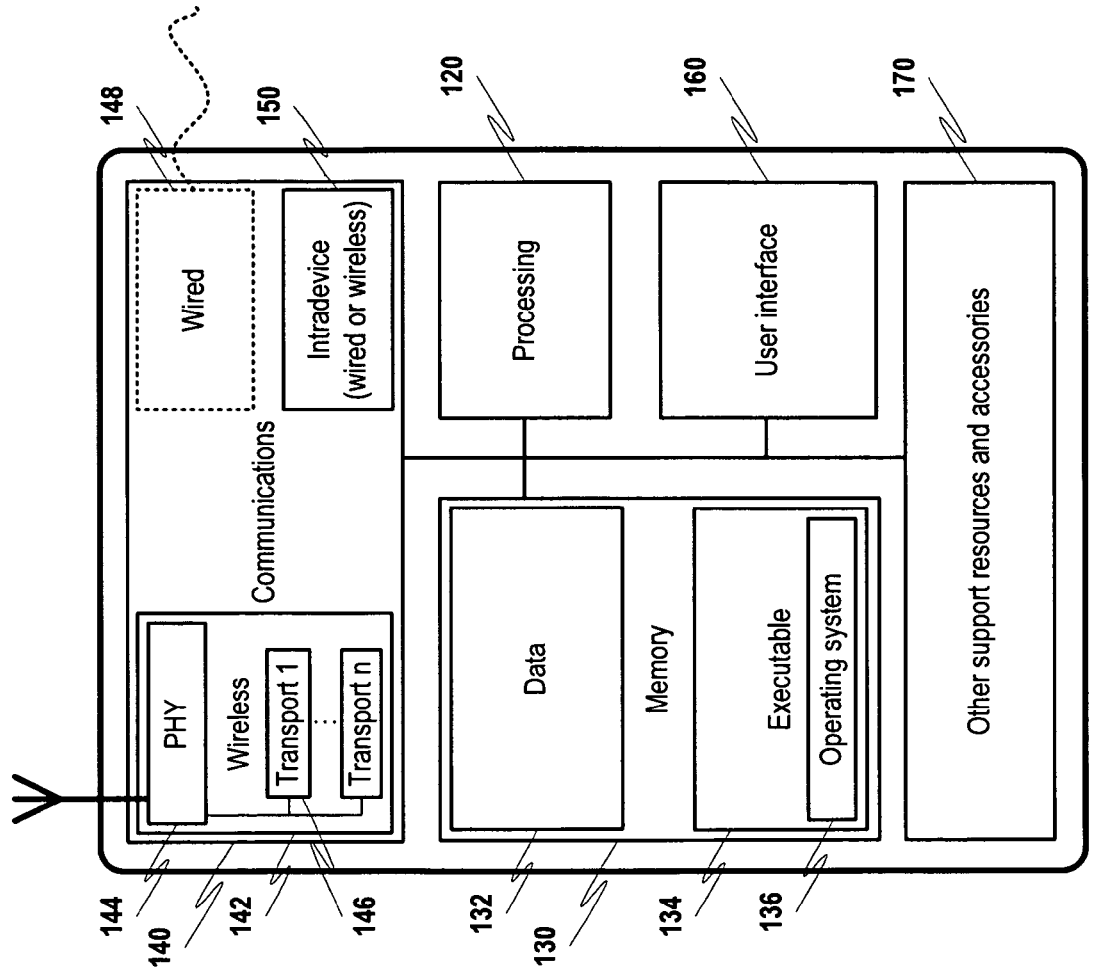
FIG. 1B discloses an example of a functional layout corresponding to the apparatuses previously described in FIG. 1A.

Now referring to FIG. 1B, an example device configuration in accordance with at least one embodiment of the present invention is disclosed. For instance, the basic layout disclosed in FIG. 1B may be applied to one or both of the example apparatuses disclosed in FIG. 1A. Processing section 120 may comprise one or more data processing components such as microprocessors, microcontrollers, discrete logic circuits, field-programmable gate arrays (FPGA), etc. Processing section 120 may be configured to perform various activities in an apparatus, including operations utilizing input data, yielding output data, triggering actions in the apparatus, etc. These operations may include, but are not limited to, arithmetic manipulation, conversion, compilation, interpretation, etc. Information used in, and created by, these activities may be stored in memory 130, which may communicate with processing section 120 via wired or wireless a communication bus.

Memory section 130 may incorporate different types of static or dynamic memory. For example, read-only-memories (ROM) and random access memories (RAM) may be made up of components from an array of available technologies such as magnetic, optical and electronic memory mediums. Memory components may further be fixed in an apparatus, or may be removable from the device in order to support data storage, loading, transfer, backup, etc. The types of information that may be stored in memory 130 may include at least data 132 and executable 134. The types of information in data 132 may include databases, text, audio and/or video (for example, multimedia), etc. Processing section 120 may utilize executable information 134 for carrying out various activities in an apparatus, including operations using data 132. For instance, operating system 136 may comprise at least one executable program configured to provide baseline operation for the apparatus.

In at least one example implementation, processing section 120 may access information stored in memory 130 when interacting with communications section 140, which may comprise at least wireless support 144 and intra-device support 150. Wireless support 140 may include resources corresponding to one or more wireless transports 142 that may access resources in physical layer (PHY) 144, such as an antenna or antenna system and corresponding support hardware, in order to communicate wirelessly with other apparatuses. Intra-device support 150 may include wired and/or wireless resources for conveying data between different sections of the apparatus. Communications 140 may optionally include resources corresponding to other forms of communication, such as wired communication support 148. Wired support 148 may comprise, for example, any hardware and/or software required for coupling to a wired communication medium.

Apparatuses usable with various embodiments of the present invention may further include user interface functionality 160, as well as other support resources and accessories 170, depending on the configuration of a particular apparatus, the use for which an apparatus is intended, etc. For example, STA-A 110 would not necessarily require extensive user interface functionality, but may include features such as battery backup, security features, etc. On the other hand, portable wireless devices may require a more extensive user interface (for example, including displays, keypads, speakers, pointing devices, microphones, etc.) as well as other resources related to desired user functionality.

In an example implementation such as mmWave communication, multiple stations may utilize beamforming to extend their range. The approach described with respect to various embodiments of the present invention may provide efficient solutions to training needs of various apparatuses based on, for example, limitations in their antenna configurations or link requirements for their applications. Such beamforming training mechanisms require flexibility and modularity so that apparatuses with functional limitations may selectively implement only the training procedures that they desire.

Figure 2:
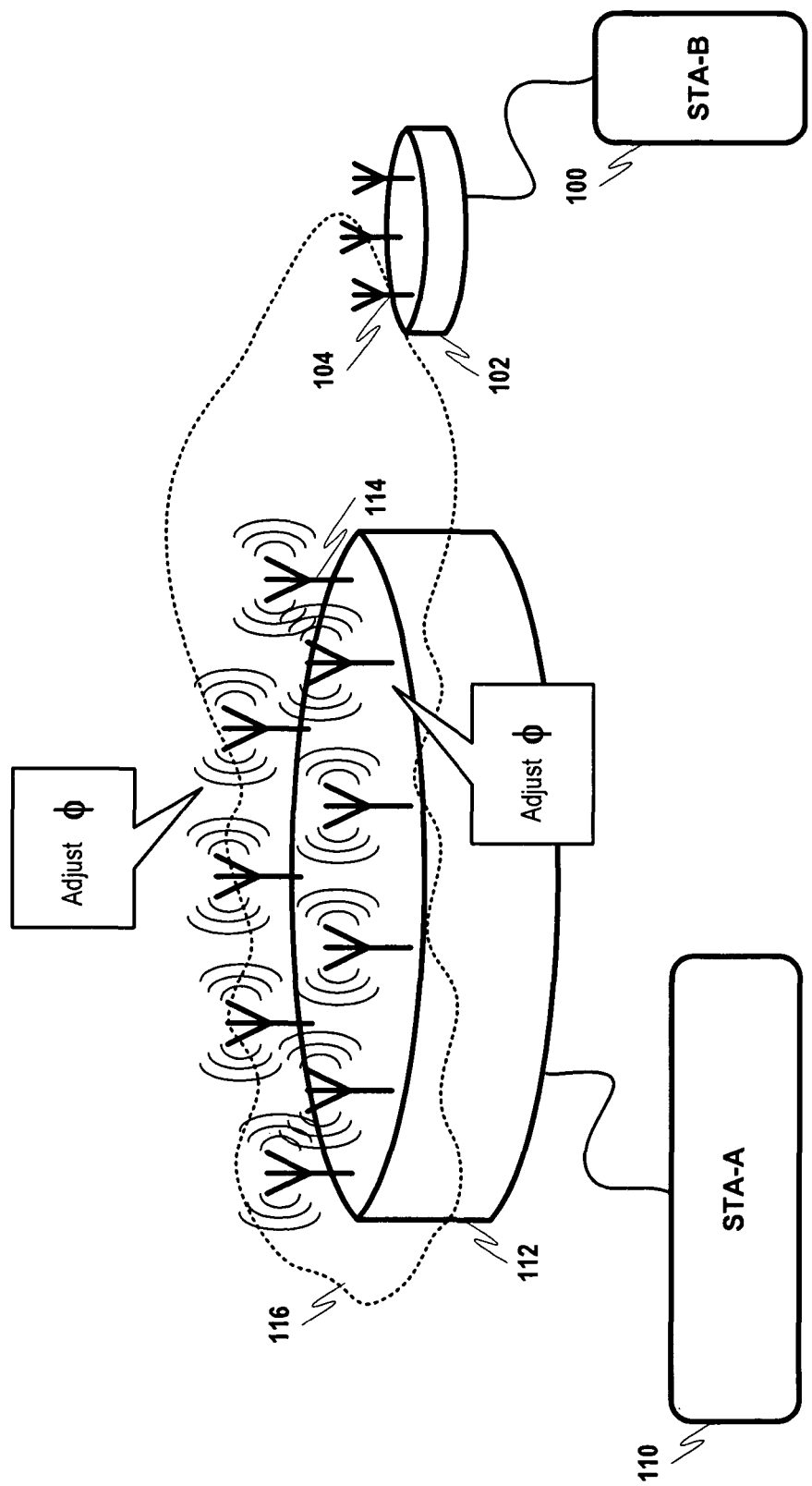
FIG. 2 discloses an example of beam forming by adjusting the phase of an antenna system in accordance with at least one embodiment of the present invention.

In accordance with at least one example embodiment of the present invention, the transmission of beamforming training frames from a control point, such as a PCP, may facilitate directional beam steering and selection in beamforming-capable stations. To increase the range of coverage, 60 GHz WLAN AP 110 and STA will both likely be equipped with multi-element antenna systems with beam steering control mechanisms, an example of which is shown in FIG. 2. High directional antenna gains at both ends may be utilized to overcome the substantial path loss common in mmWave band. Due to smaller wavelength (5 mm in 60 GHz), it is possible to integrate a large number antenna elements, in a linear or planar array configuration, in a smaller area integrated to the RF front end. As shown in FIG. 2, one or more antennas in an antenna system may be adjusted to create constructive interference between signals emitted from these antennas. The constructive interference may result in a new waveform having the combined amplitude of the original waves in a particular direction (for example, as shown at 116 in FIG. 2) that forms a communication "beam" in that direction. In apparatuses utilizing a multiple sector antenna configuration, beamforming may be performed simply by switching to the antenna sector that is in the direction determined to be best during a beamforming training operation.

Figure 3:
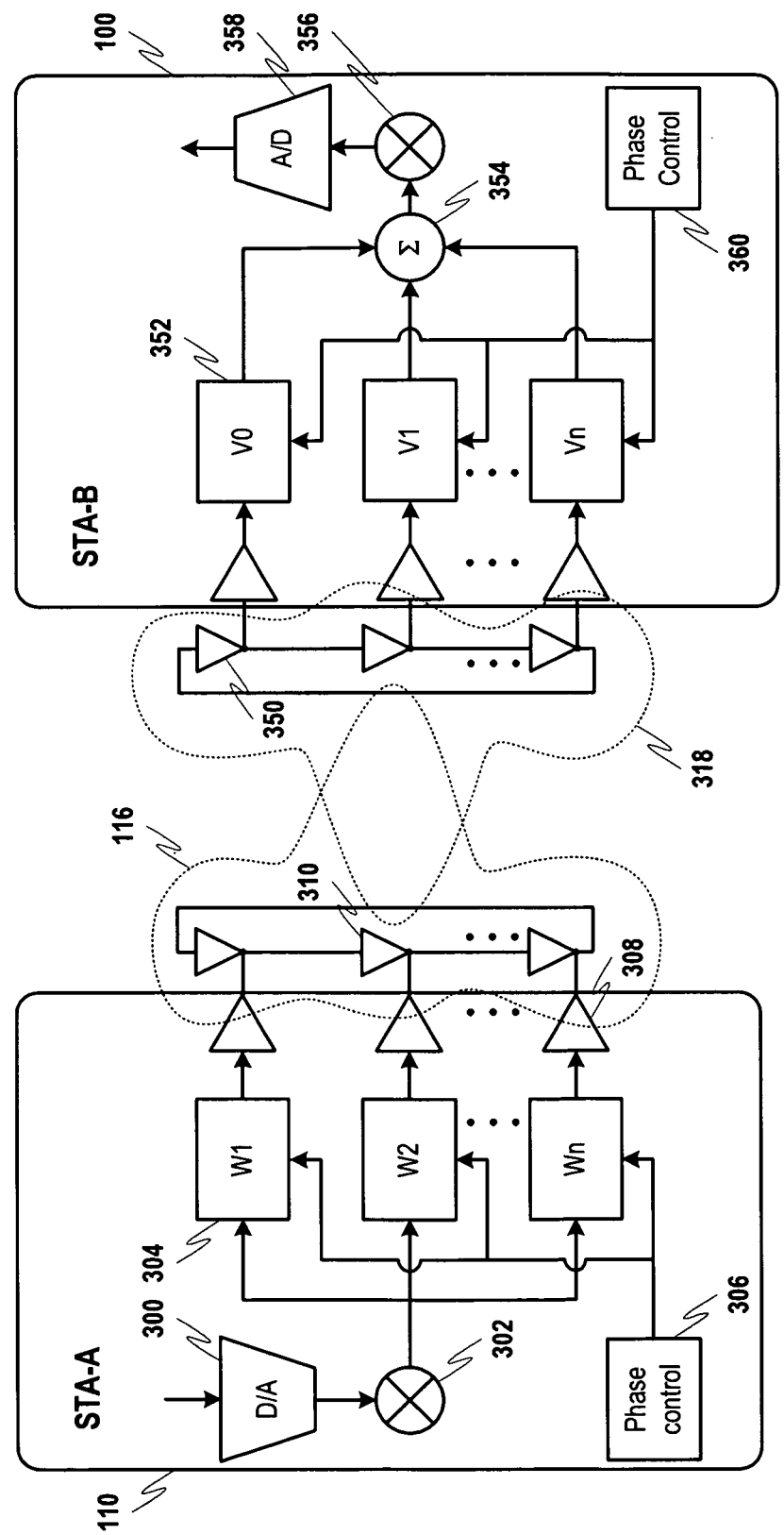
FIG. 3 discloses an example interaction of apparatuses including adjustable antenna systems in accordance with at least one embodiment of the present invention.

An example of a system for configuring a communication beam is disclosed in FIG. 3. Digital information in STA-A 110 may be converted to analog signal information in digital to analog converter (D/A) 300. The analog signal information from D/A 300 may be combined into a signal analog signal for transmission in summing element 302. In array beamforming, the phases of the feed input signals to multiple antenna elements are controlled using a predefined weight vector w (as shown at 304) and at the transmitter and v (as shown at 352) at the receiver. Phase controls 306 and 360 may adjust the gain vectors 304 and 206 to maximize antenna gains towards the desired direction of transmission and reception.

The analog signal may then be sent from antenna elements 319 to antenna element 350. As shown in FIG. 3, various embodiments of the present invention may use beam training or beamforming training to direct signals 116 and 318 in a particular direction in order to maximize the quality of the signal. The signal information may then be summed and combined by elements 354 and 356 in STA 100, the resulting analog information being converted back into digital information for use by STA 100 by analog to digital converter (A/D) 352. The transmission energy may be focused to line of sight or stronger reflection paths, whereas, other multipaths become attenuated. The set of beamforming vectors used depends on the array geometry such as linear, circular or planar arrays and the desired beam direction. For practical implementations, beam switching by integrated radio frequency (RF) phase shifters may be used in mmWave band. For example, phased arrays may be designed to include beamforming control resources that are configured to steer the beams from a set of multiple fixed beams. Such open loop schemes may be attractive for implementation in 60 GHz WLAN systems due to their simplicity and low-cost. These benefits may be realized since the feedback of channel information from the receiver will not be required.

Before two apparatuses, such as STA-A 110 and STA-B 100, may start transmitting data in accordance with a directional communication beam, the highest quality transmit and receive beam or sector directions have to be estimated during an initial training phase. Example configurations in accordance with at least one embodiment of the present invention are described below. Other examples may include, for example, the communication that may occur between two stations, between a station and another station acting as PCP, etc.

Figure 4:
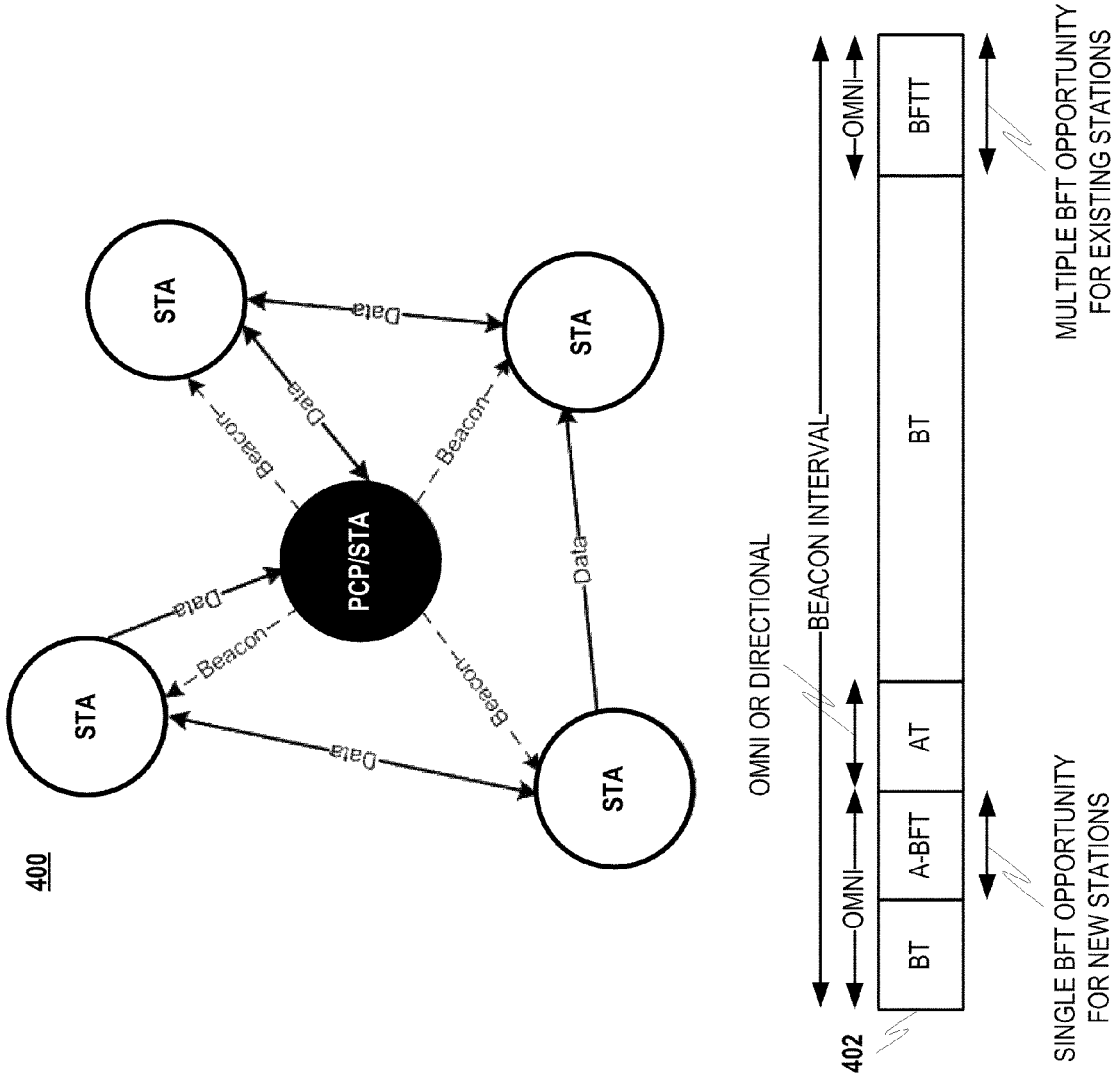
FIG. 4 discloses examples of a private basic service set (PBSS) and a beacon interval structure in a PBSS in accordance with at least one embodiment of the present invention.

Private basic service set (PBSS) network structures, such as in example 400 disclosed in FIG. 4, is an architecture that is currently being implemented. In this example structure, one station (STA) may assume the role of the PBSS control point (PCP). PCPs may provide basic timing for PBSS networks via beacons and announcement frames. In addition, PCPs may manage the quality of service (QoS), beamforming, spatial reuse, power management, and access control features of PBSS networks. Channel access may be facilitated by TDMA-like superframe structures with allocation of beacon time, beamforming training time, management frame announcement time, data service periods and contention based channel access period. An example superframe 402 that may be usable in this manner is disclosed in FIG. 4.

Beamforming protocols, along with the corresponding frame formats that facilitate use of these protocols, may not support all device capabilities. Various example embodiments of the present invention may provide beamforming training support in areas such as for PBSS networks established in mmWave WLAN systems. While WLAN has been, and will be, discussed exclusively herein, this focus is merely for the sake of explanation when describing the various example embodiments of the present invention. Thus, the use of WLAN, VHT WLAN or PBSS in these examples is not intended to limit the scope of these embodiments.

Existing methodologies are based on a single protocol flow that comprises carrying out coarse sector training only from transmit (TX) side, which is followed by continuing refinement of receive (RX) side and transmit side antenna weight vectors (AWVs). Upon completion of the iterations for beam-refinement, final beamforming completion frames are transmitted from the station that detects the end of refinement. The assumption then becomes that the receive stations have set their antenna configurations to receive omni-directionally during coarse sector training. However, battery-powered devices may have radio frequency (RF) hardware limitations. For example, battery-powered apparatuses usually have only fixed beam receive capabilities over limited directional (for example, sector) coverage. Another limitation that occurs in sectored antenna devices is that the omni-reception assumption may not apply.

Moreover, conventional beamforming systems utilize a single protocol flow coupling the TX sector-level training to the beam-refinement process. Hence, even before training begins the stations must estimate how certain aspects beam-refinement process will be completed. The latter process usually depends on the quality of link signal-to noise-ratio (SNR) that is achieved at the end of coarse training, as well as the data rate requirements of the stations. The beamforming protocol may be designed modularly by separating the sector level coarse training from fine beam-refinement processing, which may allow for a simpler implementation as well as better interoperability testing between different apparatuses. Specifying only one protocol based on an assumed receiver configuration may be problematic because devices of limited resources, ability, functionality, etc. may then excluded from the benefits of beamforming. The expected sequence of actions on both sides of the beamforming process may be very rigid in existing systems, which prevents the beneficial exploitation of power consumption efficiency, processing need and antenna configurations that may be common in functionally-limited apparatuses.

In accordance with at least one example embodiment of the present invention, coarse sector level training may be bi-directional in a fixed order from a known first station followed by other stations. After completion of sector level training from the reverse direction, a feedback response is provided in the forward direction with a request for an acknowledgement frame. As a result, coarse sector level training may now be decoupled from beam-refinement processes. Furthermore, one or more feedback responses from a first station may allow flexible control of transmit sector sweep frames from other stations based on its choices. The exchange of training frames and messages may allow for the beneficial exploitation of channel reciprocity, and may further result in faster completion of coarse training which may then move to refinement level training, or alternatively, to initiating data transmission without any refinement processing.

A new mode of sector level training for receiver antenna configurations that may not be capable of omni-RX mode training may also be provided, together with the necessary initial training setup exchanges between two peer stations. Methods for setup phase, during which the PCP is involved for facilitating training setup, may also be provided. PCPs may provide medium reservation if contention based channel access periods are used for training. When implemented using other channel time allocation strategies, PCPs may forward setup requests, response frames and may further allocate service periods for training. Different modes may be allowed for training based on requests received from initiator stations and responses received from responders based on their choices and/or capabilities. An extended beamforming training frame design may be utilized to enable receive side sector sweep or AWV selection. Procedures, such as described above, may support training for stations having different antenna configurations and preferences.

Various example implementations of the present invention may also provide mechanisms that assist in the off-line tracking of forward sector direction, relative to the PCP, for stations with fixed beam receive configurations or Rx-directional steering only devices. This functionality may require a field in the PHY headers for certain management and/or training frames that may be transmitted from a PCP using the control PHY, wherein the additional field may contain forward sector identification (ID) information for the current PCP sector used to transmit the frame. Training frame exchanges may then be shortened through the provision of sector identification (SECID) information via passive scanning. For example, algorithms in stations may be able to expedite the beamforming process by utilizing passive scanning to preemptively obtain information. A low data rate control PHY physical layer protocol data unit (PPDU) format may be implemented in mmWave WLAN systems. In the absence of any beamforming gain, some communication link is required to establish association and/or beamforming training before stations can start using beamformed links. The control PHY may provide a robust low-rate bearer for exchanging management and control frames including, for example, beacon, association request/response, announcement frames, and for exchanging information before and during beamforming training between stations. The frames exchanged for initial coarse training may utilize such a control PHY bearer.

Beamforming may involve an initial coarse training at the sector level and fine refinement training (to fine tune the AWVs). The various example embodiments of the present invention that are disclosed herein focus on the coarse training step. Instead of a single protocol flow that is tasked with addressing all beamforming training needs, the initial coarse training steps may be decoupled from subsequent refinement training steps.

Figure 5:
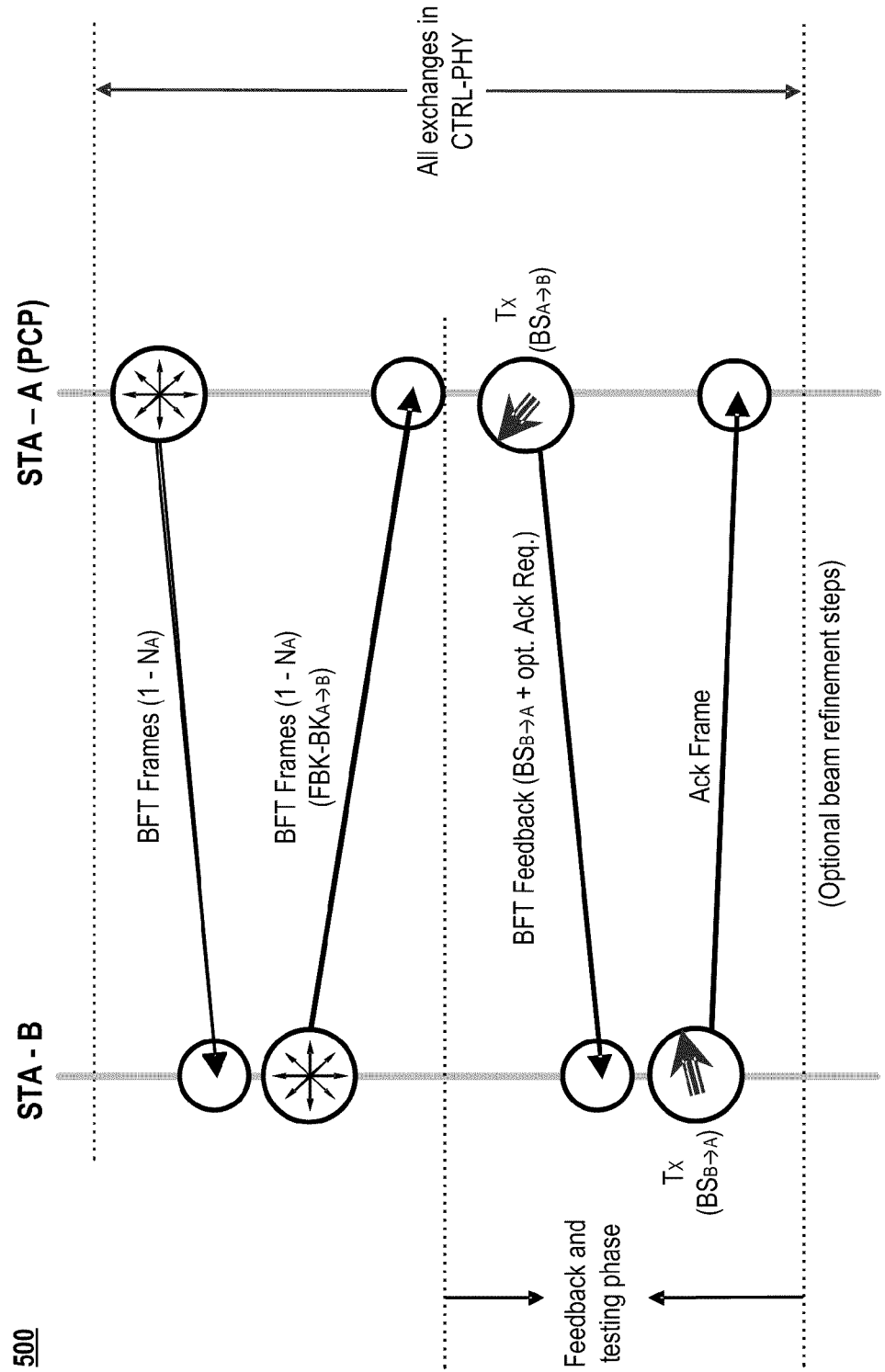
FIG. 5 discloses an example of bi-directional default mode of sector level training in accordance with at least one embodiment of the present invention.

In accordance with various example embodiments of the present invention, the bi-directional transmit sector sweep step may be considered as a default or common mode of training that will be used when no prior requests have been utilized to setup the training mechanism. As set forth above, this method is decoupled from latter beam-refinement, and may also modified to allow additional control and flexibility for stations. This mode of operation may not require any prior knowledge of station capabilities, and may be utilized to provide beamforming training between the PCP and other stations in the PBSS so that all stations may be synchronized with the PCP. The default mode of sector training is intended for beam training (BT) and association-beamforming training (A-BFT) slots of the beacon interval (BI) shown at 402 and in the example of FIG. 5.

Figure 9:
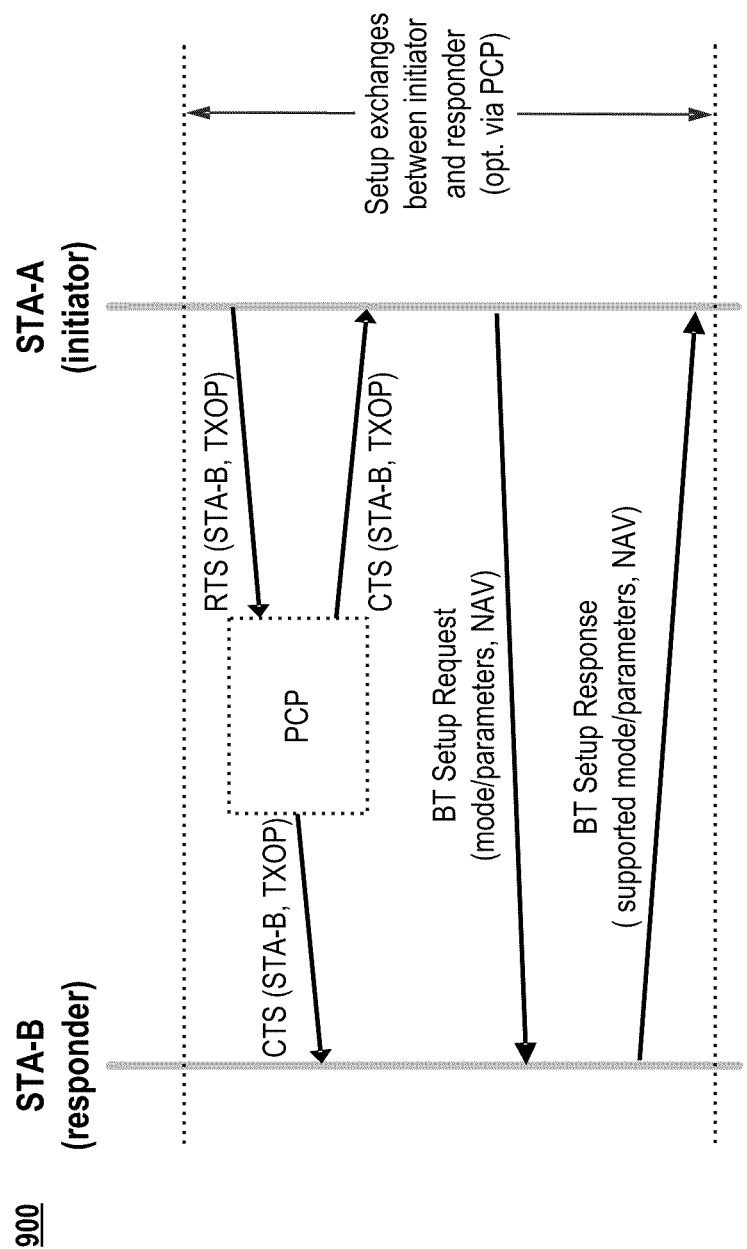
FIG. 9 discloses an example of a beamforming training setup process when the BFT training is to be requested for a contention based period (CBP) in accordance with at least one embodiment of the present invention.
Figure 13:
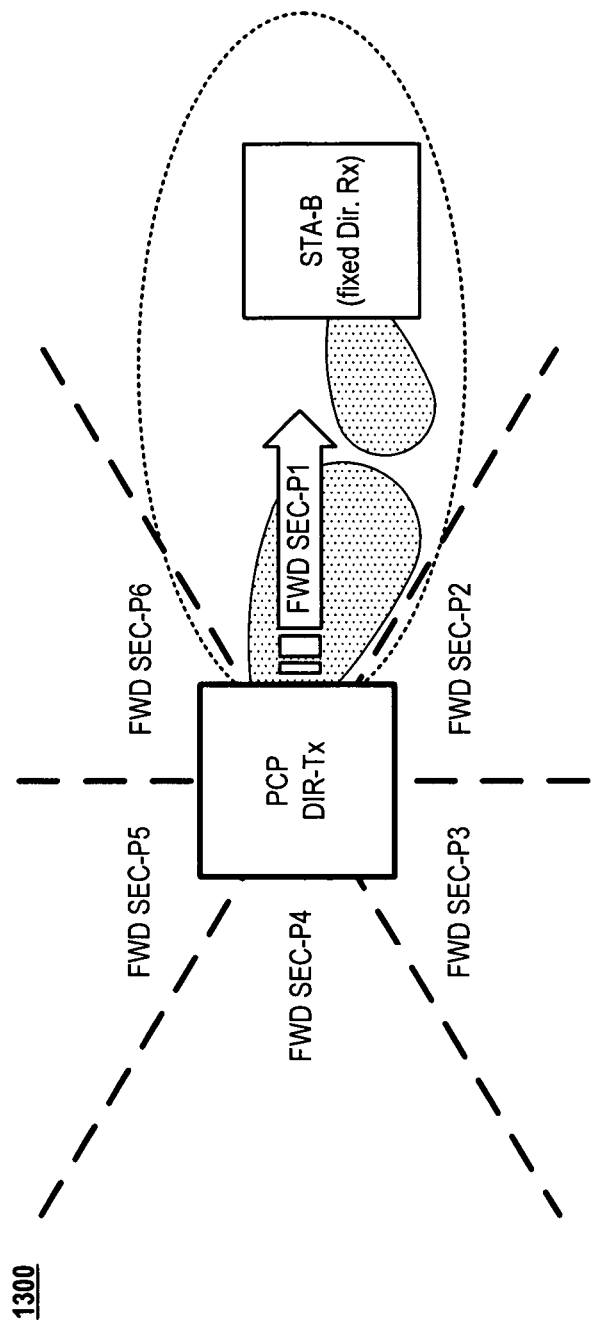
FIG. 13 discloses an example of directional private basic service set control point (PCP) transmissions towards a fixed-beam apparatus with fixed-direction reception in accordance with at least one embodiment of the present invention.

At least one objective of initial coarse training is to initiate or reestablish control PHY links between stations. Modified bi-directional sector sweeps are considered at this stage with added flexibility that may allow for modular designs where stations may be able to control the training as well facilitating protocol interoperability. An example default mode of sector level training consists of flows such as shown at 900 in FIG. 9. A station known to initiate sector training (for example, STA-A in FIG. 9) may begin transmission of beamforming training (BFT) frames using transmit sector sweep (TxSS). The BFT frame may be modified with the fields only essential to carry out sector level training (for example, as shown in the example field parameters 1002 disclosed in FIG. 10) without having to compute and exchange parameters pertaining to beam-refinement steps. The initiator may transmit one or more frames covering different sector directions, during which the receiving STA may remain in omni-RX mode, which is represented in FIGS. 9, 11 and 13 by the smaller sized circles depicted in the example activity flow. The number of frames to be transmitted (for example, sector sweep frames) may be identified in the BFT frame by a count down value.

After completion of all expected or indicated TXSS BFT frames, the responder station (for example, STA-B in FIG. 5) may start sending at least one BFT frame. The at least one frame may contain a feedback field, such a BS-FBCK subfield in the sector sweep (SS) control field (for an example see frame 1000 in FIG. 10), that notifies the identifier of the best sector (for example, $BS_{A \to B}$) frame it has received from the initiator (STA-A). After completion of BFT frames expected (or indicated) from STA-B, the initiator station sends a "BT Feedback Frame" including the sector direction corresponding to the best training signal it had received in feedback from STA-B (for example, transmits over $BS_{A \to B}$). STA-A may request an immediate acknowledgement from STA-B after the BT Feedback frame. In such instances an acknowledgement frame may be transmitted from STA-B in accordance with its best sector ($BS_{B \to A}$), which may then allow STA-A to test reception quality, which may be later used, for example, in deciding whether refinement training is necessary.

Responder stations may utilize the expected "BT Feedback Frame" from the initiator station (for example, PCP) for its flexibility to exploit under channel reciprocity. It may have two choices including performing regular TxSS transmission in a reverse mode until all frames have been transmitted (that is, for example, if STA-B expressed no preference to shorten the TX training). STA-B may transmit one or more TxSS BFT frames in a reverse mode during which the counter for frames are set in a subfield inside SS control field (for example, SEC-CDOWN as shown at 1002). STA-B may wait until it receives feedback from STA-A. If feedback is not received within a time limit (for example, a predetermined threshold condition), it may continue to transmit feedback in additional sector directions along with TxSS training. STA-B may also utilize any passive scanning knowledge it received regarding STA-A in order to reduce the duration of TxSS training. A reciprocal configuration in STA-B may allow it to proceed quickly in sending RX beam-refinement training requests to STA-A so that it may complete more precise determination of best RX direction, which will also be best TX direction.

It is possible for initiators (STA-A) to request immediate acknowledgement from STA-B (for example, based on preferences set in initiator). A BT Feedback Frame, such as shown at 700 in FIG. 7, may be utilized for this purpose. Requesting an acknowledgement may be used for completing/testing the link, or if the initiator has a reciprocal configuration, it may be utilized to test the best RX direction that was determined as a result of the prior beam training process.

Figure 6:
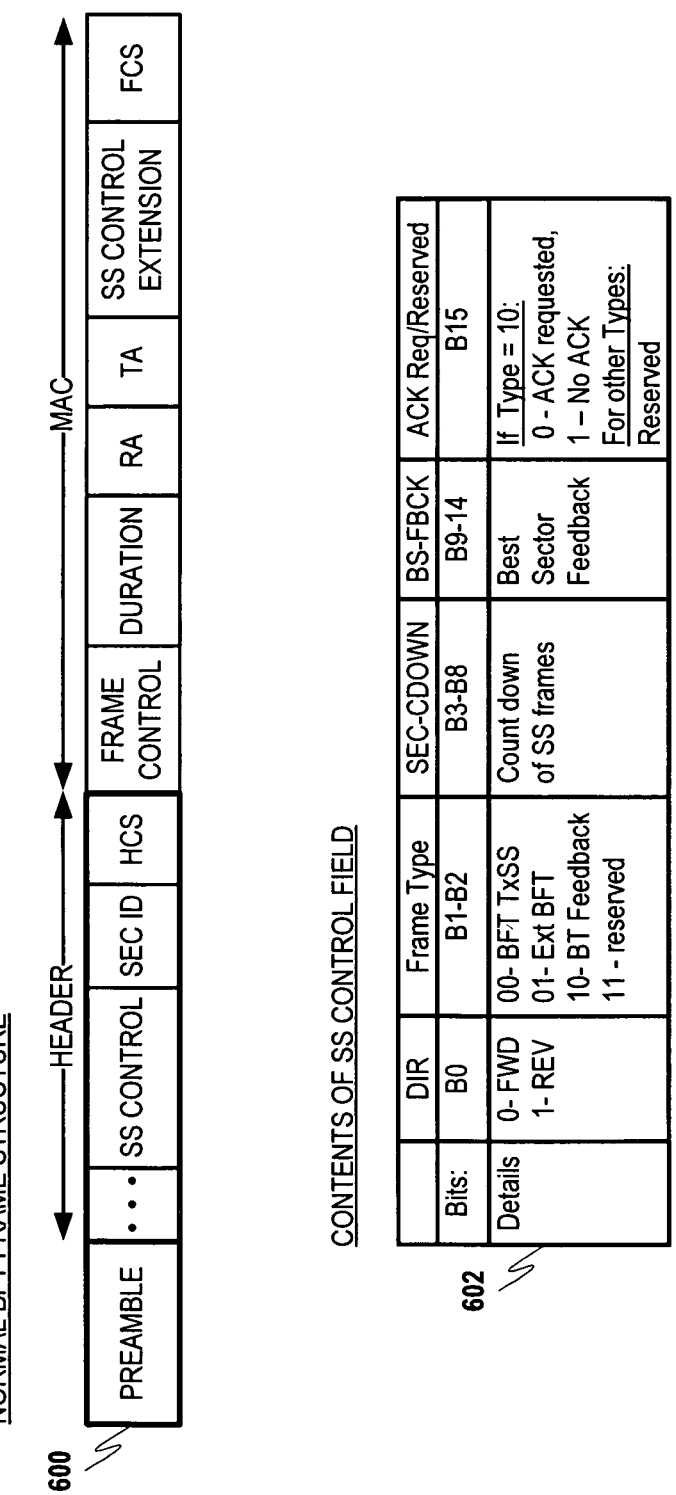
FIG. 6 discloses examples of BFT communication frames and field parameters usable in accordance with at least one embodiment of the present invention.

A normal BFT frame is used during default mode of sector level training as shown in the example of FIG. 6. An example of general structure for a frame is shown at 600. As the TX sector sweep is also provided by beacon frames during beam training (BT) time, media access control (MAC) frame payload contain scheduling and other information elements, as necessary based on if the frame may be used during BT or outside of BT. The BFT frames transmitted during the regular A-BFT or BFTT times will have shorter MAC payload. The SS Control Extension field constitutes additional parameters for SS control, which may be used to provide more information such as for backup (second best sector) link.

The use of SECID field shown at 600 in FIG. 6 may be used for the sector identification of the frame. Examples of SS control field parameters that may be carried out in PHY header are shown at 602 in FIG. 6. The following example parameter subfields may be included in the SS control field:

B0 may define the forward (FWD) or reverse (REV) direction.

B1-B2 may define the type of BFT frame such as TxSS, extended BFT or BT feedback.

B3-B8 may define the count down value for the sector sweep frames that will follow. It may be counted down for each sector frame.

B9-B14 may define the selected best sector identified by the SECID.

B15 may define the request for an acknowledgment.

Figure 7:
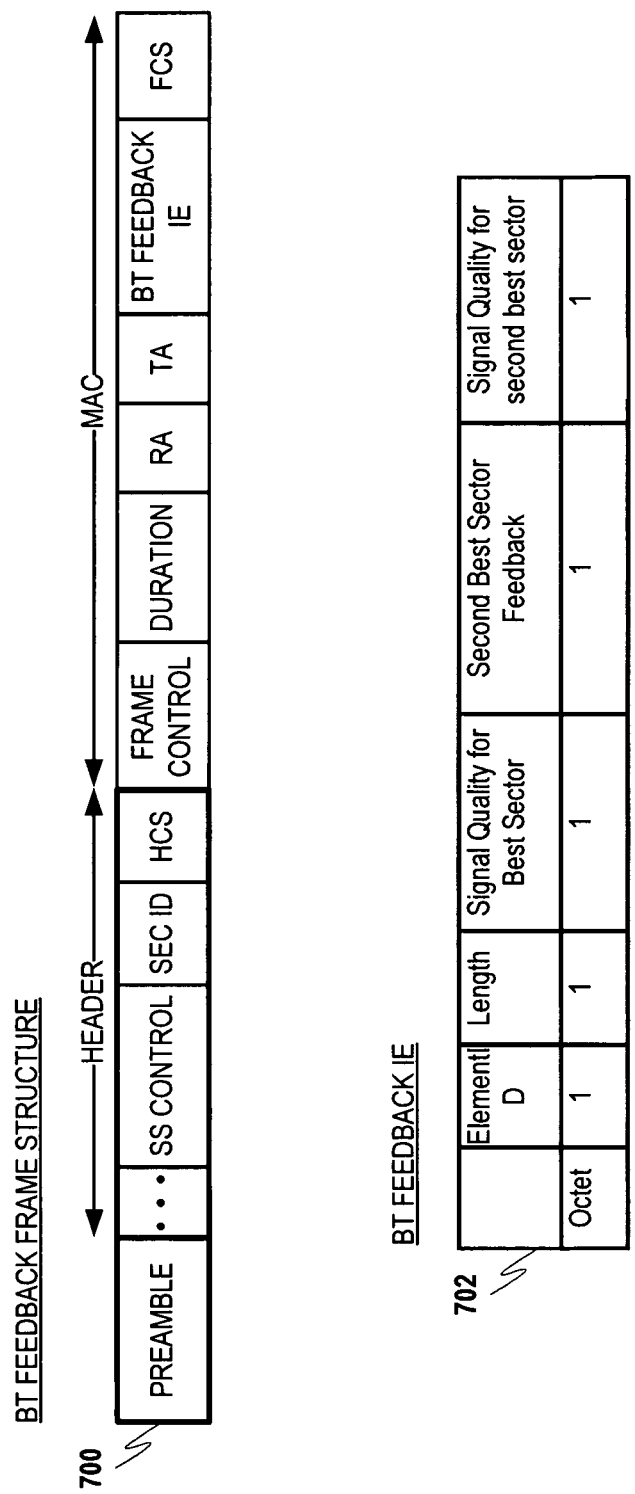
FIG. 7 discloses examples of BFT feedback communication frames and field parameters usable in accordance with at least one embodiment of the present invention.

The BT Feedback Frame may also transmitted using control PHY during initial sector level training, with the structure shown in FIG. 7 at 700. The PHY Header may contain the feedback for best sector (BS-FBCK) as in other BFT frames. Additional fields required for providing detailed feedback information such as SNR level of the best sector, second best sector id, and its SNR level may be provided by a BT Feedback information element (IE) carried inside the MAC frame payload of BT Feedback Frame as shown in FIG. 7 at 700. The use of BT Feedback IE may be optional based on a station's preference or requirements.

The default mode operation described above may provide a mechanism to establish a coarse beamformed link when the receiver antenna configurations in both sides support omni-receive mode. However, it may not support stations with antenna configurations that are not capable of omni-receive mode including fixed beam/sector devices. In accordance with at least one example embodiment of the present invention, a request based method in which different training modes may allow for the beneficial exploitation of mutual preference and capability knowledge. The request based method may also be implemented from a station to a PCP when training using the default mode is left incomplete.

Request-based training mechanisms may allow stations to use alternative training methods when interacting with the PCP in order to complete beam-forming training. Training methods may further be based on the mutual capability or preferences of participating stations (for example, the setup might require certain role from PCP as a facilitator). Request based methods, in accordance with at least example embodiment of the present invention, may consist of different training modes that may be established based on various device limitations or various training requirements of stations. Examples device limitations that may be considered when configuring beamforming training may include fixed beam or sector devices in situations where transmit and receive mode cannot occur in different sectors (for example, these apparatuses may be equipped with manual assistance and/or alert notifications that request repositioning), which may require training support from PCP and frames for BFT training should allow passive scan.

In cases of directional receive only devices (for example, sector switch capable or beam-steering capable, but not equipped with omni-directional antenna) the omni-directional reception of signals may not be possible due to hardware antenna configuration (sectored antennas or due to inflexible beam control circuit). As a result, the training methodology may need to support receive directional tracking and/or receive sector sweep. Power consumption efficiency of apparatuses may also be a concern during training. If the stations are in reciprocal configurations, receive-side training may provide enough resolution for the transmit direction, for which the suitable reverse-direction training mode can be selected. On the other hand, if the stations are in a semi-reciprocal configuration the forward direction training may not be eliminated, but may be reduced.

Prior to the start of beamforming training, a training setup process is required between the participating stations. This process may involve the exchange of basic setup messages that include the selection of at least one mode of training as shown at 900 in FIG. 9. The training procedure may involve a series of steps. In an example scenario a station may initiate beamforming training negotiation with a peer station at some point during a beacon interval, for example, during contention based periods (CBP), during polling frames received from PCP in unused time or a service period (SP) assigned by PCP. Setup may include the exchange of coarse level training request messages that request a station to act as a training signal source or destination when the station is not a PCP.

The role/responsibility of the PCP depends on channel access time. During CBP access, the processing of request to send (RTS) frames received from STA-A and NAV reservations transmitted to other stations including STA-B for the requested period (for example, STA-A may request TXOP as needed for BFT training) may be managed by sending the clear to send (CTS) frames. Following the reception of the CTS with destination address of STA-B, the STA-B will enter receive mode. The minimum role that may be required for a network PCP is disclosed at 1000 in FIG. 10. When the initiator station transmits the BT Setup Request directly to another station, BT Setup Request frames may need to be repeated over different sector directions until a response frame is received. Apart from the medium reservation for training during CBP, it is possible that the setup exchanges for training during CBP access also may involve additional assistance from PCP. For example, STA-A may first obtain TXOP with PCP to exchange the BT Setup Request for a destination STA-B. The PCP may then access the channel and forward the BT Setup Request Frame to STA-B and may further receive the BT Setup Response Frame. There may also be instances where the PCP is not involved at all in the BT setup phase.

For other channel access (for dynamic SP or regular SP) times a PCP may forward the BT Setup Request frame to other stations. The PCP may further receive BT Setup Response frames from STA-B and may further send a BT Setup Response frame back to the initiator (for example, STA-A) by inserting the allocated SP schedule for the BFT training (dynamic or regular SP).

BT Setup requests from initiator stations may contain the requested BT mode and desired parameters for training. The accepted parameters related to capabilities of peer station may be carried in BT Setup Response Frame. The PCP may provide necessary service period (SP) or transmission opportunity (TXOP) limit information for the training. When, in accordance with the depicted example, STA-A and STA-B have already established beamformed links with the PCP, BT Setup Request/Response frames may be completed though the PCP using regular high-throughput (HT) data PHY. If any of the stations have only control-PHY link working towards PCP, the stations may transmit/receive these frames using control-PHY data rates. Requesting stations may use the BT Mode Control parameters based on the different training objectives or device limitations described above.

Figure 8:
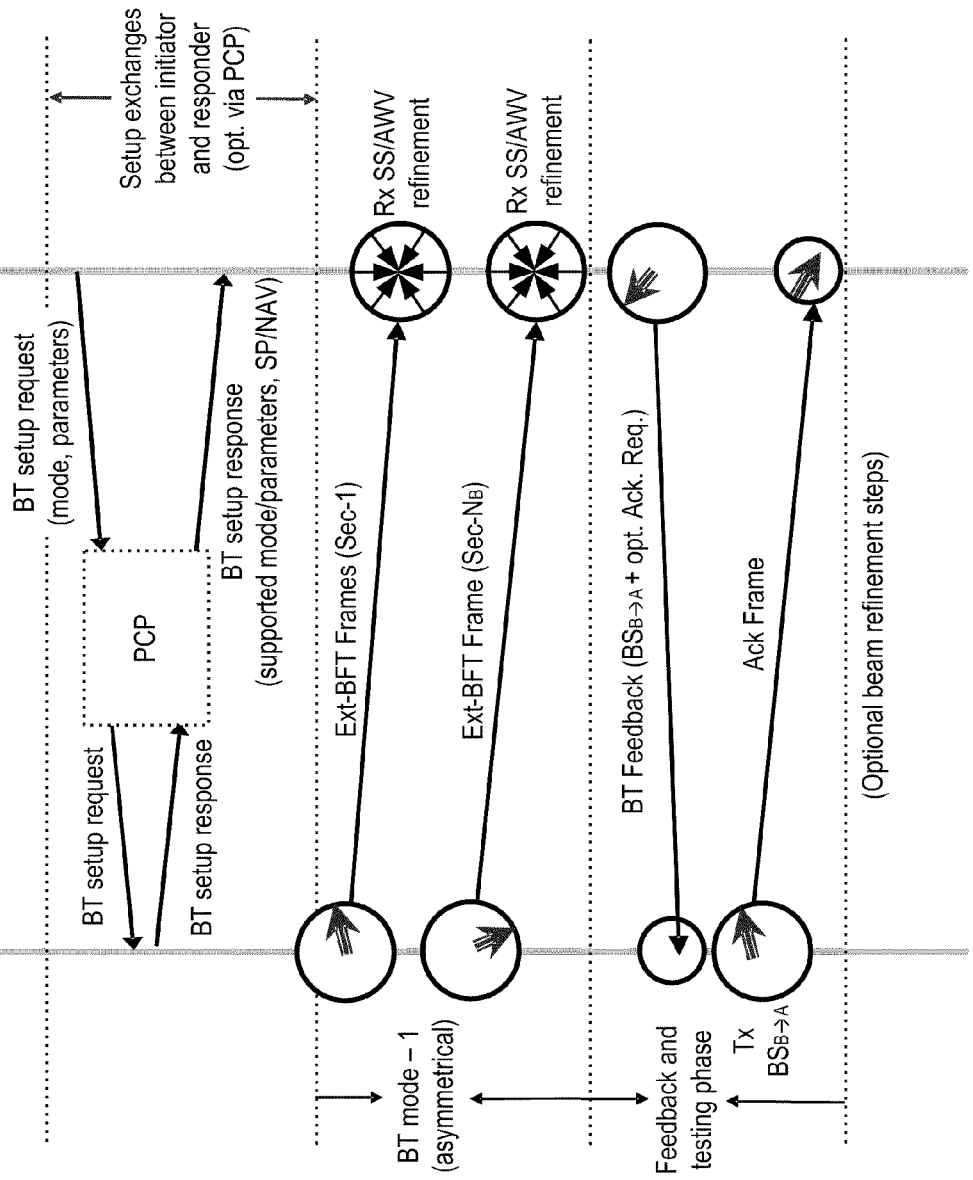
FIG. 8 discloses an example of asymmetric sector training in accordance with at least one embodiment of the present invention.

Different orders or sequences of training frame transmission may be implemented between two peer stations. For example, the asymmetrical training mode 800 disclosed in FIG. 8 may involve transmit side and receive side operations. At the known start time of training, the responder station (for example, STA-B) may begin transmission of BFT Frames using a transmit side sector sweep covering different sector directions. An "Extended BFT Frame" (an example of which is disclosed in FIG. 11 at 1100) may be transmitted over each sector direction, which may be followed by next direction after a known BIFS (beamforming interframe spacing) interval. Each Extended BFT Frame may comprise preamble and PHY header repetitions transmitted in same transmit direction to allow beam steering or sector sweep over N_RxDIR directions in STA-A in it's receive mode. An example of PHY header repetitions is disclosed at 1102 in FIG. 11. For the period of each segment of the BFT Frame, the receiving station may determine its receive signal quality over the corresponding beam or sector direction when the signal that is received is above certain threshold. The receiving station may only receive frames transmitted from only one or few transmit sector directions.

The receiver station may track the signal quality of frames, and when it may receive at least one or more BFT frames successfully (with respective SEC-CDOWN and SECID). During a feedback and testing phase, the receiver station may respond with a BT Feedback Frame indicating best sector (BS B→A) after the expected end time or after the last BFT is received (for example, a frame with SEC-CDOWN=0). STA-A may further require immediate acknowledgement from STA-B after the BT Feedback frame, in which case, STA-A may test the reverse (REV) link signal quality from the received acknowledgement (ACK) frame.

Figure 10:
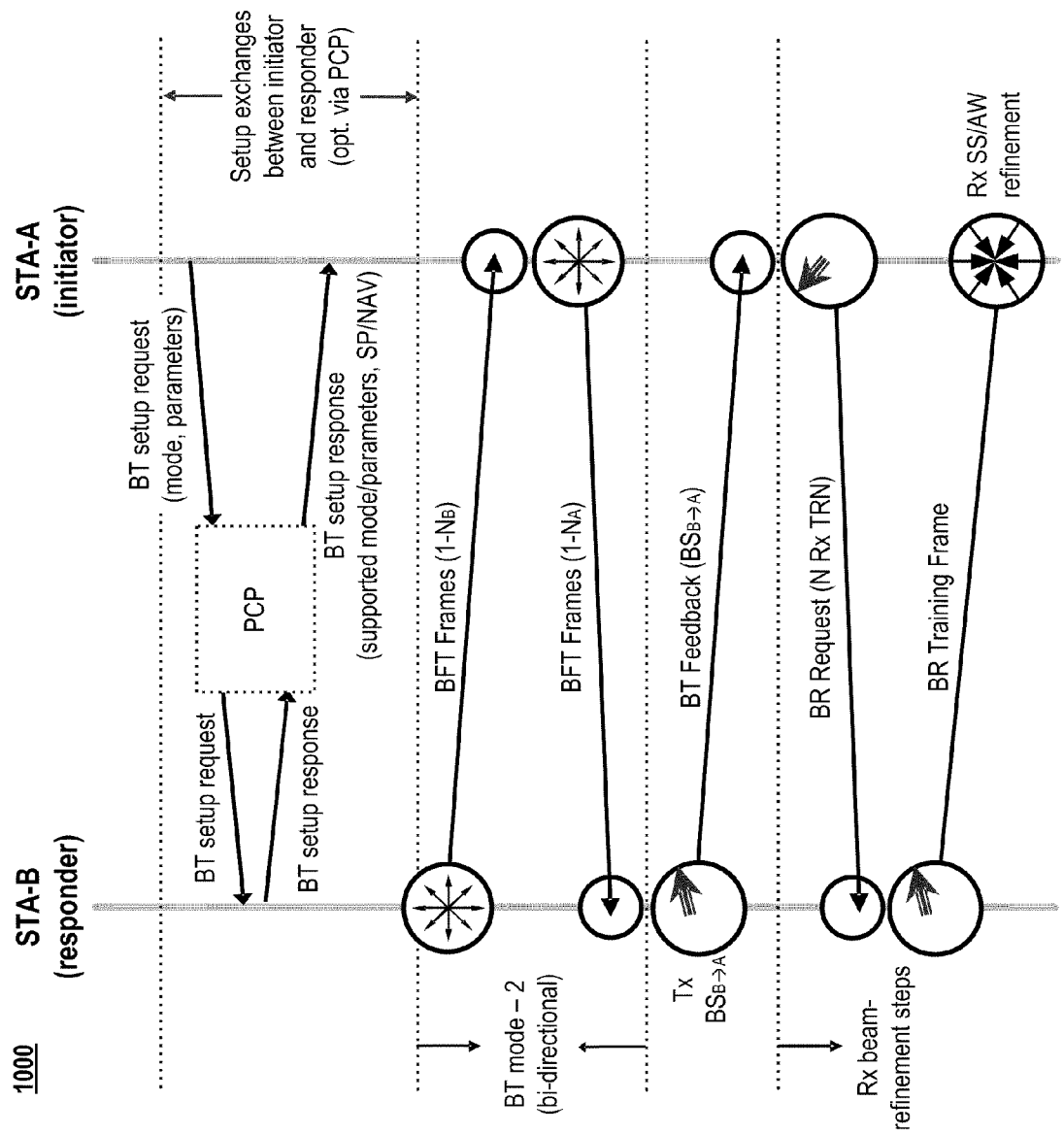
FIG. 10 discloses an example of bi-directional sector training in accordance with at least one embodiment of the present invention.
Figure 11:
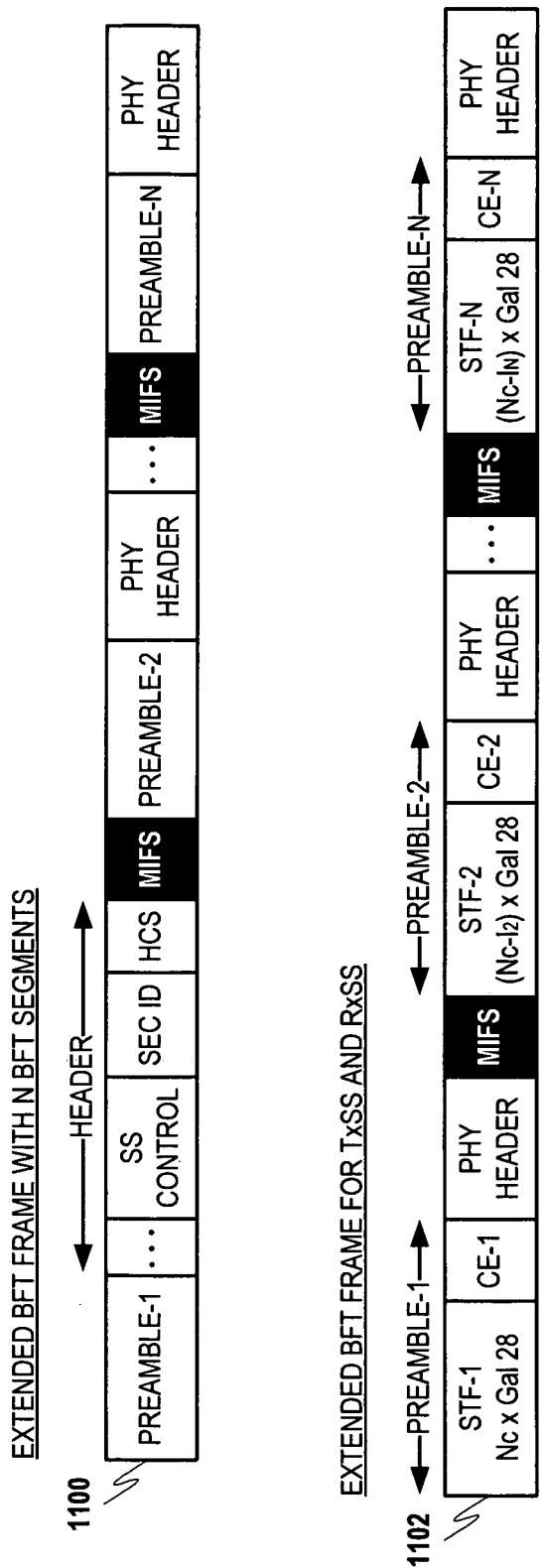
FIG. 11 discloses examples of extended BFT frames usable in accordance with at least one embodiment of the present invention.

Another example of request based sector training is shown in FIG. 10 at 1000. An example of receive side beam refinement step is shown after the end of the sector level training to illustrate a possible choice. The objective of requesting TxSS BFT Frame from a peer station first may be to establish a REV link with REV TX-side sector selection, followed by sending few frames in forward (FWD) direction until feedback is received, so that the coarse training is completed faster. STA-A may then have the option to separately request only RX beam-refinement training from STA-B, as shown.

Possible structures for the frame formats and associated fields for request based training may include a normal BFT Frame: control PHY frame format with only one preamble for coarse TxSS over one direction, an extended BFT Frame: control PHY frame format with more than one preamble and header for allowing coarse RxSS/AWV selection for the receiver, BT Feedback Frame: contains only best sector feedback, optional SNR feedback, optional sector feedback and SNR feedback of the backup link (second best sector), BT Setup Request Frame: information on desired mode and parameters and BT Setup Response Frame: supported parameters and mode.

To support coarse receive direction sector sweep or AWV selection, an extended BFT frame may be employed. Two variants of extended BFT Frame are considered, the choice of which may depend on the supported implementation complexity at the receiver. A first variant, an example structure of which is as shown at 1100 in FIG. 11, uses the same preamble for all segments of Ext-BFT Frame. The MAC payload for addresses may be removed since the flow of the Extended BFT in an assigned slot that occurs between two known stations. MIFS represents the minimum interframe spacing to be used to allow RxSS time. The duration depends on the implementation, which may be set to "0" in the best case scenario.

Another variant of the extended BFT frame format uses progressively decreasing length for the short training field as shown at 1102. Given a control PHY short training field (STF) that contains Nc repetitions of length 128 complementary Golay sequence Ga128. Then the next preamble may be shortened by I2, and next by I3, etc. The number of STF may not be less than Nc repetitions of Ga128 used for normal HT PHY frames. The progressively shortened STF in each preamble may allow receiver synchronization in each subsequent RX-direction with partial detection and CFO estimation knowledge from prior preambles. To relax the synchronization at the receiver, longer preambles may be used at one or more initial segments.

A general frame structure of BT Setup Request frame is shown in FIG. 12 at 1200. BFT Request information element (IE) field 1202 may consist of BT Mode Control, which consists of order of training, which directions are used for training, a number of requested or supported transmit sector directions or receive direction per BFT frame (example configuration of which are provided at 1204). For example, when a requesting STA is omni-directional RX capable and would like to use an omni-directional RX mode, it may sets its "REV N_RxDIR" value to 0 (to indicate one RxDIR). The FWD RxDIR_Limit subfield may indicate whether the requesting STA supports transmission of Extended BFT Frame (with maximum limit set by FWD RxDIR_Limit) or not (FWD RxDIR_Limit=0). An optional sector Training Map (list of sector ids, max could be set to 8, as an example) may also be included. The BT Setup Response Frame structure is similar to that of BT Setup Request Frame with additional IE for scheduling information when the SP is assigned by the PCP and supported parameters for BT Mode Control field will be used.

The internal preference of stations on request of different BT modes may be determined based on the BT Setup Request from the initiator station, which is used for different modes of training and orders. The request could also be for a default bi-directional mode to train in both FWD and REV links by fully omni-RX capable stations or for one direction only (for example, only forward or only reverse). It may also involve transmission of TxSS frames first with indication of maximum number of sectors supported. STA-B will then send TxSS frames. STA-A sends feedback with possible ACK request. Requests for other training modes may include the objective of training to establish/improve REV link only or to support DIR-RX only configuration or for exploiting channel reciprocity in FWD direction.

The BT mode control field in BT Setup Request frame may be used to request STA-B to send Extended BFT frames over all or selected sectors to allow RxSS (for example as depicted at 800). If the initiator has only one antenna (for example, omni-directional TX and RX), it may just need training from the REV direction for TxSS, which may be followed by sending training sequences from STA-A for STA-B's RX-refinement, if necessary. Portable or handheld devices may, for example, prefer to receive training frames from peer stations for conserving power rather than transmitting BFT frames from its side.

Reciprocity refers the condition that same RF chains are used for transmit and receive operation. Under favorable channel conditions (for example, nearly line of sight propagations), such configuration may result in the optimal receive direction also being the optimal transmit direction, and vice versa. Beamforming training may be reduced when reciprocity conditions exist. It may allow the use of RxSS/AWV selection from the training received from other side instead of providing full TxSS from its side. The training processed during receive mode may conserve resources in portable or handheld devices. If apparatuses are only partially reciprocal and TxSS is done first, stations may minimize the training for RxSS/AWV selection by using only smaller subsets of RX directions clustered towards best TX sector direction while processing the extended BFT Frames. On the contrary, if RxSS completes first, the TxSS/AWV selection may be minimized by sending a reduced number of BFT frames with TX directions clustered around the best RX sector. The different sector training modes described above may provide further flexibility by allowing further utilization of channel reciprocity.

In accordance with at least one example embodiment of the present invention, a SECID Field may be used in various training frames and certain management frames, which may be part of the PHY header. The SECID field, as shown in frames 600 in FIG. 6, 700 in FIG. 7 and 1100 in FIG. 11, denotes the sector direction of the frame being transmitted using control PHY from PCP. By mandating the PCP maintain a fixed assignment of its coarse transmit sector ID internally and advertise the SECID of the frame being transmitted directionally, certain device classes may be allowed to benefit from passive scanning of such frames for beamforming training. Reasons for including the "SECID" field in PHY header of frames being used by the PCP for transmission of beamforming training frames, and certain management and control frames may include the provision of directional awareness for stations in the PBSS about direction towards PCP. In particular, a fixed beam device or DIR-RX only device may passively scan these frames to identify the FWD link sector ID of the frames from PCP when its current RX-DIR pointing may detect such frames. Such stations may passively track their receive directional acquisition towards PCP. This principle may be also extended for other non-PCP stations for mutual awareness, which may assist in spatial reuse, interference avoidance etc.

The SEC-CDOWN field in SS Control field of the PHY header in BFT frames (as disclosed at 600, 602 in FIG. 6, 700 in FIG. 7, 1100 in FIG. 11 and 1204 in FIG. 12) may provide a countdown of number of frames being transmitted for sector sweep training. However, the SEC-CDOWN field may only be correctly interpreted by stations that are involved in the training. The PCP may utilize a subset of TxSS frames during one beacon interval and use another subset of sectors in another beacon interval. Hence, indication of a frame's SEC-CDOWN counter is not enough. For other management frames used in AT (Announcement Request and Response Frames), CTS frames used by PCP during CBP for medium reservation, the SEC-CDOWN field is not used, for which, the SECID field will provide such advantages. The "SECID" field in PHY header will provide the required assistance for passive directional awareness and tracking by DIR-RX only devices. An example is shown at 1300 in FIG. 13, wherein a fixed beam device may detect a frame in FWD SEC-P1 to exploit for its beamforming training with PCP.

A passive scan algorithm may be used for DIR-RX only or fixed beam devices for BFT Training Support. For example, devices that are trying to search a PCP for BFT training and association may scan frames coming from PCP by decoding the "SECID" field in PHY header of BFT and other management or extension frames during beacon, A-BFT, AT, CBP and BFTT periods. These devices may, based on reception quality, sweep across its Rx-DIR and computes signal quality for different FWD sector ids from PCP. The passive scan may also provide a list of FWD SECID from PCP with relative signal quality which may be received.

For DIR-RX only STAs, information obtained by passive scanning may provide notification as to the RX-directions from which it may best receive the frames from PCP. Based on passive scan results, it may initiate BF training and association more efficiently. In particular, During A-BFT slot apparatuses may send feedback and required mode of BF training to PCP with indication of training over few sectors (by using the "Sector Training Map" shown, for example, at 1406 with the list of FWD sector directions in the BT Setup Request Frame). Apparatuses may further transmit "BT Setup Request" frames to the PCP for initiating BFT during contention period with possible indication of training over few sectors, when stations have reciprocal configuration or partially reciprocal conditions, during training time from its side (for example, for TxSS an apparatus may initiate transmission of TxSS BFT frames clustered over the reduced set of sector directions over which it was able to receive the frames from PCP during its passive scan or tracking), or for reception of extended BFT Frames from PCP, if it may only do RxSS or AWV selection over the limited Rx-Directions based on the prior scan knowledge.

Figure 14A:
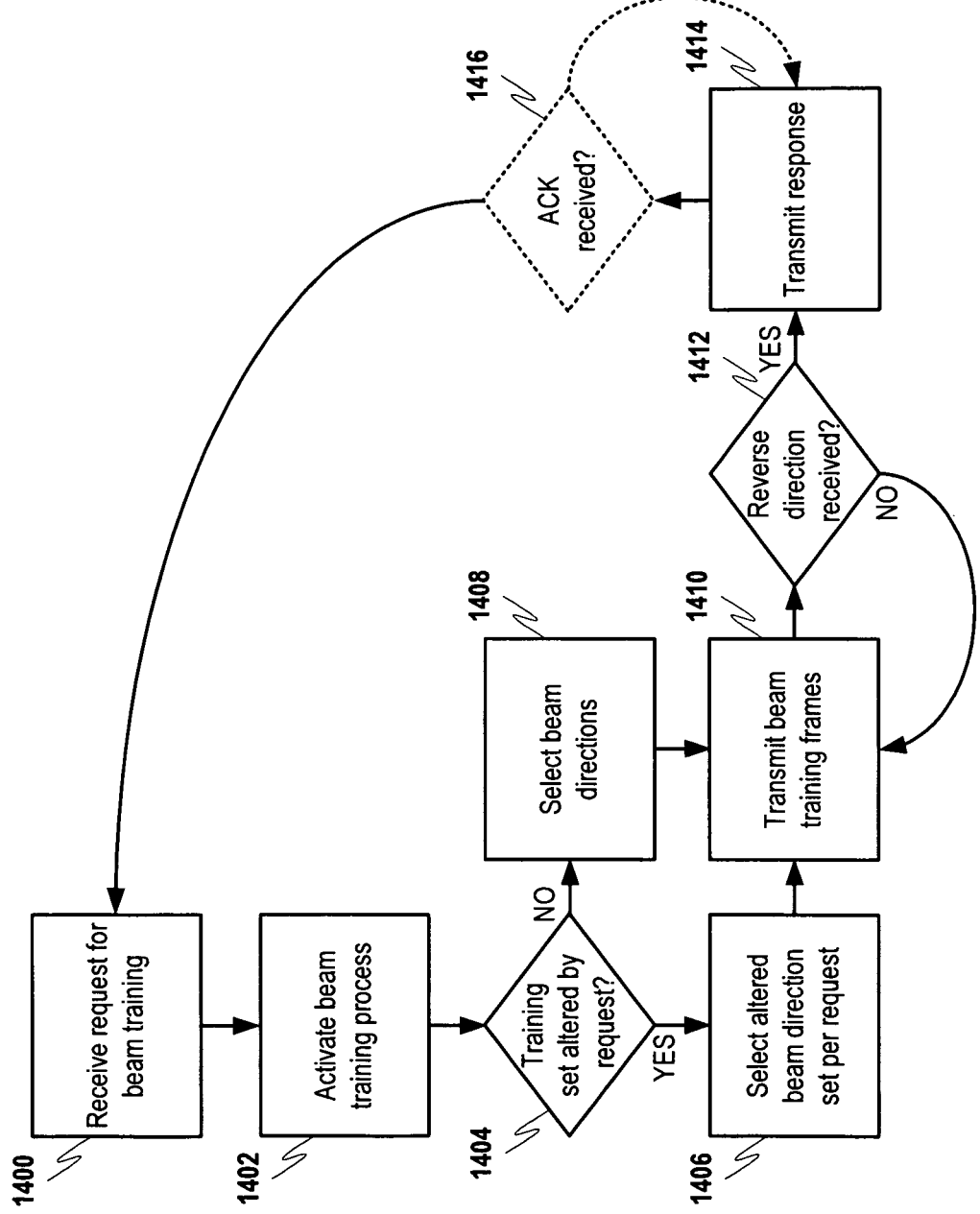
FIG. 14A discloses a flowchart of an example process in accordance with at least one embodiment of the present invention.

In accordance with at least one example embodiment of the present invention, a flowchart of a process from the perspective of a responder apparatus is disclosed in FIG. 14A. In step 1400 a responder apparatus may receive a request for beamforming from another apparatus. It is not essential to define whether the responder apparatus is a station or PCP, as both would act similarly with respect to the disclosed process. A beamforming process may then be initiated in step 1402. A determination may then be made in step 1404 as to whether the received request specifies an altered training sequence. For example, a requesting station may have received control and/or management frames when in a passive mode that allow it narrow down the possible directional sectors that may be best for communicating with the responder. This information may then be used to provide adjusted parameters in the request message that reduce the number of directional sections over which training frames must be sent, to reduce the overall number of training frames, etc. Further, the request message may specify a particular operational mode that is being requested by the initiator. Certain modes may be requested, for example, due to the condition of an apparatus (for example, power level). If information in the received request message indicates that the training set should be altered, then in step 1406 a set of beam directions, in accordance with the parameters set forth in the request message, may be selected. Alternatively, a standard beam direction set may be selected in step 1408.

Regardless of whether an altered or standard set of beam directions is being implemented, the process may proceed to step to step 1410 where a set of beam training frames is transmitted. For example, at least one beam training frame may be transmitted in each of the selected beam training directions. In addition, each of the beam training frames may contain at least a distinct identifier. The responder apparatus (for example, a station or PCP) may then await a response (for example, the receipt of reverse direction beam training frames) in step 1412. As set forth above, there may be instances where the process may be altered through parameters supplied by the initiator. For example, the initiator may instruct that no reverse direction beam training frames will be sent due to, for example, concerns about expending power for transmission.

Presuming that reverse direction frames are expected, and subsequently received, the process may proceed to step 1414 wherein a response message may be transmitted from the responder to the initiator. The response message may at least identify the best signal direction (for example, may include identification information that was provided by one or more reverse direction frames corresponding to the highest quality received signals). The response message may further request that the initiator send an acknowledgement back to the responder. In instances where an acknowledgement is required, optional step 1416 may be implemented. In step 1416 the process may continue to transmit responses and await an acknowledgement until the acknowledgement is received. The process may then return to step 1400 to await further beam training requests.

Figure 14B:
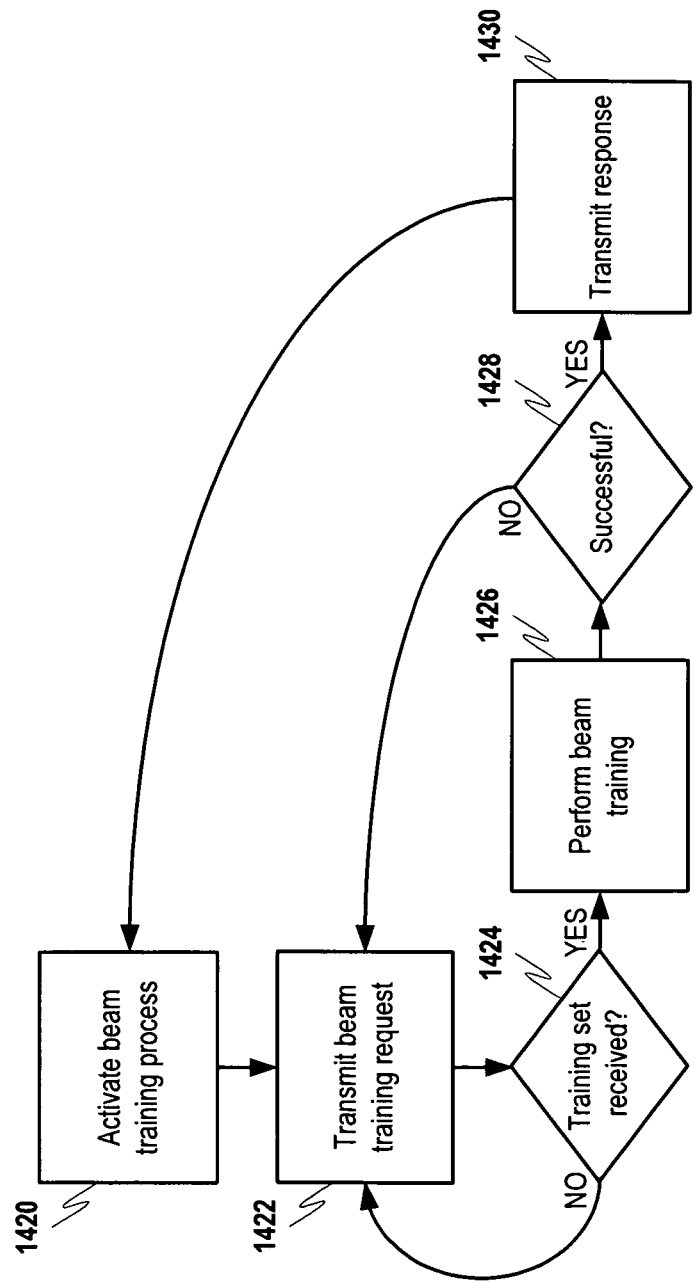
FIG. 14B discloses a flowchart of another example process in accordance with at least one embodiment of the present invention.

Further to the above, a flowchart of another process usable in accordance with various embodiments of the present invention is now disclosed in FIG. 14B. However, the process in FIG. 14B is taken from the viewpoint of an example initiator apparatus. In step 1420 a beam training process may be activated in the initiator apparatus. The beam training process may trigger the formulation of a beam training request for transmission to a responder apparatus. The beam training request may comprise, for example, information that is usable by the responder apparatus in customizing the beam training process. Information that may be included in the beam training may include, but is not limited to, a particular beam training mode, a number of beam training frames, a reduced set of beam training directions, etc. Examples of beam training modes include a forward beam training mode, a reverse beam training mode or bidirectional beam training mode. This information may be provided or prompted by control or management frames received while the apparatus was operating in a passive mode, from knowledge that the other apparatus is operating in a reciprocal mode, from other criteria corresponding to the initiator such as current apparatus condition, etc. The transmission of the beam training request in step 1422 may depend on the topology of the wireless network. For example, ad-hoc (for example, PBSS) network may include a PCP, and therefore, all requests may be routed through the PCP regardless of the particular station from which beam training is being requested. The same protocols may exist in wireless networks that contain other central controllers like access points.

The initiator may await the receipt of a training set in step 1424. This step may include both waiting for certain durations and retransmission of the request message. The receipt of a beam training set (for example, one or more beam training frames received from one or more beam directions) may allow the initiator to perform beam training in step 1426. If the beam training is successful in step 1428 a response may be transmitted in step 1430. Successful beam training may comprise, for example, the successful receipt of one or more beam training frames, wherein the quality level corresponding to the received beam training frames is below a predetermined threshold level (for example, a minimum acceptable level). The process may then return step 1400 to await the next requirement for beam training. Alternatively, if the beam training process is not successful in step 1428, then the process may return to step 1422 to transmit a new beam training request.

Accordingly, it will be apparent to persons skilled in the relevant art that various changes in form a and detail may be made therein without departing from the spirit and scope of the invention. The breadth and scope of the present invention should not be limited by any of the above-described example embodiments, but should be defined only in accordance with the following claims and their equivalents.

What is claimed:

1. A method, comprising:
   activating, by an apparatus, a beamforming training support operation in the apparatus;
   selecting, by the apparatus, predetermined directions for transmitting one or more forward direction beamforming training frames from the apparatus, each forward direction beamforming training frame comprising a forward beam/sector direction identifier denoting one of a plurality of forward sector directions of the frame being transmitted;
   transmitting at least one of the one or more forward direction beamforming training frames in each of the selected predetermined directions from the apparatus;
   receiving at least one reverse direction beamforming training frame including one of the forward beam/sector direction identifiers at the apparatus from one of the predetermined directions that corresponds to the at least one forward direction beamforming training frame that was determined to have a signal characteristic; and
   transmitting at least one response frame including a reverse beam/sector direction identifier received in the at least one reverse direction beamforming training frame from the apparatus.

2. The method of claim 1, wherein each of the one or more forward direction beamforming training frames and one or more reverse direction beamforming training frames further comprises an indication of a remaining quantity of sector sweep frames to be transmitted.

3. The method of claim 1, wherein the reverse beam/sector direction identifier transmitted in the at least one response frame corresponds to the at least one reverse direction beamforming training frame that was determined to have the best signal quality.

4. The method of claim 1, wherein the response frame further comprises a request for acknowledgement.

5. The method of claim 1, further comprising receiving an acknowledgement frame from a direction corresponding to the reverse beam/sector direction identifier transmitted in the response frame.

6. A method, comprising:
   activating, by an apparatus, a beamforming training support operation in the apparatus;
   transmitting a beamforming training request from the apparatus, the beamforming training request comprising at least information for configuring a beamforming training operation, the information identifying at least one training mode, wherein the information identifies at least one of a forward direction beamforming training mode denoting either a transmit side plural sector sweep or a receive side plural sector sweep, a reverse direction beamforming training mode denoting either a transmit side plural sector sweep or a receive side plural sector sweep or a bidirectional beamforming training mode denoting either a transmit side plural sector sweep or a receive side plural sector sweep;
   receiving at least one beamforming training response frame in the apparatus in response to the beamforming training request, the beamforming training response frame comprising beamforming control information for the requested beamforming mode; and
   activating, by the apparatus, a beamforming training operation in the apparatus based on the at least one training mode and indication of support for the at least one training mode in the response frame.

7. The method of claim 6, wherein the beamforming training request further comprises an indication of a reduced number of sectors to utilize during forward or reverse direction beamforming training, the reduced number of sectors being derived from beamforming training frames or management frames received during a passive scan mode.

8. The method of claim 6, wherein the beamforming training request further indicates an order for first executing the forward beamforming training mode or the reverse beamforming training mode.

9. The method of claim 6, wherein the beamforming training request is transmitted to other apparatuses via a private basic service set control point.

10. The method of claim 6, wherein the beamforming training request is transmitted directly to peer apparatuses from which beamforming training is being requested.

11. The method of claim 6, wherein activating a beamforming training operation further comprises:
   receiving at least one reverse direction beamforming training frame in the apparatus, each reverse direction beamforming training frame optionally including a requested number of training segments and each segment including a sector direction identifier denoting one of a plurality of sector directions of the segment;
   determining, by the apparatus, a signal quality for each training segment or training frame received from a predetermined receive direction during the beamforming training frame; and
   transmitting at least one response frame including one of a plurality of reverse beam/sector direction identifiers determined to have the best signal quality during the reception of the at least one reverse direction beamforming training frame from the apparatus.

12. The method of claim 11, wherein the response frame further comprises a request for an acknowledgement.

13. A computer program product comprising computer executable program code recorded on a non-transitory computer readable storage media, the computer executable program code comprising:
   code configured to cause an apparatus to activate a beamforming training support operation in the apparatus;
   code configured to cause the apparatus to select predetermined directions for transmitting one or more forward direction beamforming training frames from the apparatus, each forward direction beamforming training frame comprising a forward beam/sector direction identifier denoting one of a plurality of forward sector directions of the frame being transmitted;
   code configured to cause the apparatus to transmit at least one of the one or more forward direction beamforming training frames in each of the selected predetermined directions;
   code configured to cause the apparatus to receive at least one reverse direction beamforming training frame including one of the forward beam/sector direction identifiers from one of the predetermined directions that corresponds to the at least one forward direction beamforming training frame that was determined to have a signal characteristic; and
   code configured to cause the apparatus to transmit at least one response frame including a reverse beam/sector direction identifier that was received in the at least one reverse direction beamforming training frame.

14. A computer program product comprising computer executable program code recorded on a non-transitory computer readable storage media, the computer executable program code comprising:
   code configured to cause an apparatus to activate a beamforming training support operation in the apparatus;
   code configured to cause the apparatus to transmit a beamforming training request from the apparatus, the beamforming training request comprising at least information for configuring a beamforming training operation, the information identifying at least one training mode, wherein the information identifies at least one of a forward direction beamforming training mode denoting either a transmit side plural sector sweep or a receive side plural sector sweep, a reverse direction beamforming training mode denoting either a transmit side plural sector sweep or a receive side plural sector sweep or a bidirectional beamforming training mode denoting either a transmit side plural sector sweep or a receive side plural sector sweep;
   code configured to cause the apparatus to receive at least one beamforming training response frame in the apparatus in response to the beamforming training request, the beamforming training response frame comprising beamforming control information for the requested beamforming mode; and
   code configured to cause the apparatus to activate a beamforming training operation in the apparatus based on the at least one training mode and indication of support for the at least one training mode in the response frame.

15. An apparatus, comprising:
a processor; and
at least one memory including executable instructions, the at least one memory and the executable instructions being configured to, in cooperation with the at least one processor, cause the apparatus to perform at least the following:

activate a beamforming training support operation in the apparatus;

select predetermined directions for transmitting one or more forward direction beamforming training frames from the apparatus, each forward direction beamforming training frame comprising a forward beam/sector direction identifier denoting one of a plurality of forward sector directions of the frame being transmitted;

transmit at least one of the one or more forward direction beamforming training frames in each of the selected predetermined directions;

receive at least one reverse direction beamforming training frame including one of the forward beam/sector direction identifiers from one of the predetermined directions that corresponds to the at least one forward direction beamforming training frame that was determined to have a signal characteristic; and transmit at least one response frame including a reverse beam/sector direction identifier received in the at least one reverse direction beamforming training frame.

16. The apparatus of claim 15, wherein each of the one or more forward direction beamforming training frames and one or more reverse direction beamforming training frames further comprises an indication of a remaining quantity of sector sweep frames to be transmitted.

17. The apparatus of claim 15, wherein the reverse beam/sector direction identifier transmitted in the at least one response frame corresponds to the at least one reverse direction beamforming training frame that was determined to have the best signal quality.

18. The apparatus of claim 15, wherein the response frame further comprises a request for acknowledgement.

19. The apparatus of claim 15, further comprising the at least one memory and the executable instructions being configured to, in cooperation with the at least one processor, cause the apparatus to receive an acknowledgement frame from a direction corresponding to the reverse beam/sector direction identifier transmitted in the response frame.

20. An apparatus, comprising:
a processor; and
at least one memory including executable instructions, the at least one memory and the executable instructions being configured to, in cooperation with the at least one processor, cause the apparatus to perform at least the following:

activate a beamforming training support operation in the apparatus;

transmit a beamforming training request comprising at least information for configuring a beamforming training operation, the information identifying at least one training mode, wherein the information identifies at least one of a forward direction beamforming training mode denoting either a transmit side plural sector sweep or a receive side plural sector sweep, a reverse direction beamforming training mode denoting either a transmit side plural sector sweep or a receive side plural sector sweep or a bidirectional beamforming training mode denoting either a transmit side plural sector sweep or a receive side plural sector sweep;

receive at least one beamforming training response frame in the apparatus in response to the beamforming training request, the beamforming training response frame comprising beamforming control information for the requested beamforming mode; and activate a beamforming training operation in the apparatus based on the at least one training mode and indication of support for the at least one training mode in the response frame.

21. The apparatus of claim 20, wherein the beamforming training request further comprises an indication of a reduced number of sectors to utilize during forward or reverse direction beamforming training, the reduced number of sectors being derived from beamforming training frames or management frames received during a passive scan mode.

22. The apparatus of claim 20, wherein the beamforming training request further indicates an order for first executing the forward beamforming training mode or the reverse beamforming training mode.

23. The apparatus of claim 20, wherein the beamforming training request is transmitted to other apparatuses via a private basic service set control point.

24. The apparatus of claim 20, wherein the beamforming training request is transmitted directly to peer apparatuses from which beamforming training is being requested.

25. The apparatus of claim 20, wherein the at least one memory and the executable instructions being configured to, in cooperation with the at least one processor, cause the apparatus to:

receive at least one reverse direction beamforming training frame, each reverse direction beamforming training frame optionally including a requested number of training segments and each segment including a sector direction identifier denoting one of a plurality of sector directions of the segment;

determine a signal quality for each training segment or training frame received from a predetermined receive direction during the beamforming training frame; and transmit at least one response frame including one of a plurality of reverse beam/sector direction identifiers determined to have the best signal quality during the reception of the at least one reverse direction beamforming training frame.

26. The apparatus of claim 25, wherein the response frame further comprises a request for an acknowledgement.

27. An apparatus, comprising:
means for activating a beamforming training support operation in the apparatus;

means for selecting predetermined directions for transmitting one or more forward direction beamforming training frames from the apparatus, each forward direction beamforming training frame comprising a forward beam/sector direction identifier denoting one of a plurality of forward sector directions of the frame being transmitted;

means for transmitting at least one of the one or more forward direction beamforming training frames in each of the selected predetermined directions;

means for receiving at least one reverse direction beamforming training frame including one of the forward beam/sector direction identifiers from one of the predetermined directions that corresponds to the at least one forward direction beamforming training frame that was determined to have a signal characteristic; and means for transmitting at least one response frame including a reverse beam/sector direction identifier received in the at least one reverse direction beamforming training frame.

28. The method of claim 1, wherein the one of the forward beam/sector direction identifiers included in the received at least one reverse direction beamforming training frame, corresponds to the at least one forward direction beamforming training frame that was determined to have a best signal quality.

29. The computer program product of claim 13, wherein the one of the forward beam/sector direction identifiers included in the received at least one reverse direction beamforming training frame, corresponds to the at least one forward direction beamforming training frame that was determined to have a best signal quality.

30. The apparatus of claim 15, wherein the one of the forward beam/sector direction identifiers included in the received at least one reverse direction beamforming training frame, corresponds to the at least one forward direction beamforming training frame that was determined to have a best signal quality.

31. The apparatus of claim 27, wherein the one of the forward beam/sector direction identifiers included in the received at least one reverse direction beamforming training frame, corresponds to the at least one forward direction beamforming training frame that was determined to have a best signal quality.

* * * * *